United States Patent
Cummins et al.

(10) Patent No.: US 12,437,042 B2
(45) Date of Patent: Oct. 7, 2025

(54) METHODS AND APPARATUS FOR PERSISTENT BIOMETRIC PROFILING

(71) Applicant: Micron Technology, Inc., Boise, ID (US)

(72) Inventors: Jaime Cummins, Boise, ID (US); Jeremy Chritz, Boise, ID (US); Tamara Schmitz, Boise, ID (US); Robert F. Gazdzinski, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 264 days.

(21) Appl. No.: 17/024,462

(22) Filed: Sep. 17, 2020

(65) Prior Publication Data

US 2021/0089637 A1    Mar. 25, 2021

Related U.S. Application Data

(60) Provisional application No. 62/903,582, filed on Sep. 20, 2019.

(51) Int. Cl.
*G06F 21/32* (2013.01)
*G06F 21/62* (2013.01)
(Continued)

(52) U.S. Cl.
CPC .......... *G06F 21/32* (2013.01); *G06F 21/6209* (2013.01); *H04L 67/133* (2022.05);
(Continued)

(58) Field of Classification Search
None
See application file for complete search history.

(56) References Cited

U.S. PATENT DOCUMENTS 8,447,273 B1 * 5/2013 Friedlander ....... H04M 1/72463
382/116
8,752,144 B1    6/2014 Kaufman et al.
(Continued)

OTHER PUBLICATIONS

Wojtowicz et al.; "Model for adaptable context-based biometric authentication for mobile devices"; 2016; retrieved from the Internet https://link.springer.com/article/10.1007/s00779-016-0905-0; pp. 1-13, as printed. (Year: 2016).*

(Continued)

*Primary Examiner* — Michael W Chao
(74) *Attorney, Agent, or Firm* — Greenberg Traurig

(57) ABSTRACT

Methods and apparatus for biometric data maintenance, access and distribution across two or more experiential and/or network domains. In one embodiment, a 5G NR-based network architecture is provided which allows ultra-low latency and effectively user-imperceptible biometric data use for e.g., authentication and maintenance of user state across multiple domains via multiple constituent user devices (e.g., UEs). The network architecture includes both (i) a distributed biometric database (BDB) model wherein relevant biometric data for individuals/UEs is intelligently cached in various portions of the distributed database, and (ii) centralized and local BAEs (biometric analytics entities) which manage the aforementioned intelligent caching, as well as network configuration using one or both of 5G NR network "slicing" and CU/DU split options to optimize end-user biometric-related applications such as those providing identification/authentication, AR functions, VR functions or yet others.

26 Claims, 27 Drawing Sheets

(51) Int. Cl.
  *H04L 67/133* (2022.01)
  *H04L 67/30* (2022.01)
  *H04L 67/50* (2022.01)
  *H04W 8/18* (2009.01)
  *H04W 12/60* (2021.01)
  *H04W 24/02* (2009.01)
  *H04W 72/04* (2023.01)
  *H04L 67/306* (2022.01)

(52) U.S. Cl.
  CPC ............ *H04L 67/30* (2013.01); *H04L 67/535* (2022.05); *H04W 8/18* (2013.01); *H04W 12/60* (2021.01); *H04W 24/02* (2013.01); *H04W 72/04* (2013.01); *H04L 67/306* (2013.01)

(56) References Cited

U.S. PATENT DOCUMENTS

| | | | |
|---|---|---|---|
| 8,955,066 B1* | 2/2015 | Ackerman | G06F 21/316 726/5 |
| 9,961,547 B1* | 5/2018 | Molina-Markham | H04M 1/67 |
| 10,289,819 B2* | 5/2019 | Stavrou | G06F 21/316 |
| 10,303,869 B1 | 5/2019 | Duke et al. | |
| 10,326,748 B1* | 6/2019 | Brisebois | G06F 21/31 |
| 10,819,920 B1* | 10/2020 | Hamlin | G06F 1/1686 |
| 11,030,603 B1* | 6/2021 | Asefi | G06Q 20/40 |
| 11,252,655 B1* | 2/2022 | Gupta | H04L 67/02 |
| 11,562,062 B1* | 1/2023 | Mishra | H04L 63/0876 |
| 11,575,685 B2* | 2/2023 | Ford | H04L 63/1433 |
| 2002/0158873 A1* | 10/2002 | Williamson | G06T 7/85 345/427 |
| 2004/0228363 A1* | 11/2004 | Adamczyk | H04J 3/16 370/468 |
| 2007/0180047 A1* | 8/2007 | Dong | A61B 5/117 600/300 |
| 2008/0232276 A1* | 9/2008 | Guntur | H04L 45/00 370/256 |
| 2010/0115610 A1 | 5/2010 | Tredoux et al. | |
| 2011/0314549 A1* | 12/2011 | Song | G06F 21/554 726/28 |
| 2012/0310587 A1* | 12/2012 | Tu | G01D 1/16 702/181 |
| 2013/0142384 A1* | 6/2013 | Ofek | H04W 4/023 382/103 |
| 2013/0227651 A1* | 8/2013 | Schultz | G06F 21/32 726/4 |
| 2014/0002443 A1* | 1/2014 | Cunningham | G06T 19/006 345/419 |
| 2014/0161322 A1* | 6/2014 | Cheng | A63B 24/00 382/107 |
| 2014/0171200 A1* | 6/2014 | Ur | H04N 1/00 463/31 |
| 2014/0337945 A1* | 11/2014 | Jia | G06F 21/32 726/6 |
| 2016/0013985 A1* | 1/2016 | Reddy | H04L 63/0892 726/4 |
| 2016/0021081 A1 | 1/2016 | Caceres et al. | |
| 2016/0021117 A1* | 1/2016 | Harmon | H04L 63/20 726/1 |
| 2016/0063471 A1* | 3/2016 | Kobres | G06Q 20/40 705/18 |
| 2016/0182503 A1 | 6/2016 | Cheng et al. | |
| 2016/0291704 A1* | 10/2016 | Jackson | G06F 3/0346 |
| 2016/0378861 A1* | 12/2016 | Eledath | G06V 20/52 707/766 |
| 2017/0032417 A1* | 2/2017 | Amendjian | G06Q 30/0254 |
| 2017/0039368 A1 | 2/2017 | Grobman et al. | |
| 2017/0109514 A1 | 4/2017 | Cheng et al. | |
| 2017/0109940 A1* | 4/2017 | Guo | G06T 7/30 |
| 2017/0124713 A1* | 5/2017 | Jurgenson | G06F 3/04815 |
| 2017/0161478 A1* | 6/2017 | Stavrou | G06F 21/32 |
| 2017/0199998 A1* | 7/2017 | Bruno | G06F 21/34 |
| 2018/0082304 A1 | 3/2018 | Summerlin et al. | |
| 2018/0091638 A1* | 3/2018 | Torres | H04W 64/006 |
| 2018/0165882 A1* | 6/2018 | Choi | G06F 16/29 |
| 2018/0183789 A1* | 6/2018 | Tischart | H04L 63/0876 |
| 2019/0018943 A1 | 1/2019 | Zhang et al. | |
| 2019/0065855 A1* | 2/2019 | Lerman | G06V 20/20 |
| 2019/0206074 A1* | 7/2019 | Oryoji | G06T 17/20 |
| 2019/0260730 A1* | 8/2019 | Mainali | G06F 21/316 |
| 2019/0364027 A1* | 11/2019 | Pande | G06F 21/316 |
| 2020/0092495 A1* | 3/2020 | Siau | H04N 23/90 |
| 2020/0129080 A1* | 4/2020 | Pu | G06F 21/32 |
| 2021/0212581 A1* | 7/2021 | Kim | A61B 5/14532 |
| 2022/0109673 A1* | 4/2022 | Robinson-Morgan | H04W 12/069 |

OTHER PUBLICATIONS

Zhang et al.; Continuous Authentication Using eye Movement Response of Implicit Visual Stimuli; 2017; retrieved from the Internet https://dl.acm.org/doi/abs/10.1145/3161410; pp. 1-22, as printed. (Year: 2017).*

Extended European Search Report, ep20866842.6, mailed on Nov. 24, 2023.

* cited by examiner

METHODS AND APPARATUS FOR PERSISTENT BIOMETRIC PROFILING

PRIORITY

This application claims priority to co-owned and U.S. Provisional Patent Application Ser. No. 62/903,582 filed Sep. 20, 2019 and entitled "METHODS AND APPARATUS FOR PERSISTENT BIOMETRIC PROFILING," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The following relates generally to, inter alia, computerized "intelligence" systems and algorithms, and in one exemplary aspect to creation, storage, distribution and use of persistent biometric profiles associated with individuals or groups of individuals or other entities.

2. Description of Related Technology

Biometric data (also known as "biometrics") generally relates to one or more physical or other parameters uniquely associated with an entity such as a human being or other living creature. Biometric authentication is used in computerized systems for any number of purposes including e.g., identification and access control, identification of individuals (e.g., via facial recognition/analysis software), and for medical characterization of individuals.

A number of different aspects of human physiology, behavior, or even chemistry can be used for biometric applications. Biometric parameters are often categorized; e.g., as physiological versus behavioral. Physiological characteristics are related to the tangible or measureable characteristics of an entity, such as e.g., fingerprints, palm prints and/or blood vessel configuration, facial dimensions, DNA, hand geometry (e.g., relationship of lengths of the fingers on a given hand), iris or retinal patterns, odor/scent, voiceprint (i.e., frequency/harmonic analysis), and overall body proportions (e.g., height, and relationship to other parameters such as arm length/span).

Conversely, behavioral parameters are related to the patterns of behavior of an entity, including for example handwriting, speech patterns and accents, patterns of movement such as nervous ticks, eye blinking, respiratory patterns, and gestures.

Ostensibly, desirable biometric parameters are those which produce data that is unique to each individual in a population, and which have other useful (or at least predictable) attributes. In one model, the selection of a particular biometric parameter or set of parameters for use in a specific application involves consideration of several factors. For example Jain et al. (1999) (Jain, A. K.; Bolle, R.; Pankanti, S., eds. (1999). *Biometrics: Personal Identification in Networked Society*. Kluwer Academic Publications) identified seven factors to be used when assessing biometric feature for use in e.g., biometric authentication, including:

(i) universality (every entity under biometric analysis should possess a given trait);
(ii) uniqueness (the trait should be sufficiently differentiable for different entities such that each can be uniquely identified);
(iii) permanence (the degree to which that trait varies over time);
(iv) measurability (the relative ease of data acquisition/processing or measurement of the trait);
(v) technological performance (the accuracy, speed, and robustness of technology used to gather data about the trait and assess it);
(vi) adoption (how well individuals in the relevant population of entities under analysis accept the technology and gathering of their personal data); and
(vii) circumvention (the ease with which the trait might be imitated or subverted).

Accordingly, each given trait or parameter of an entity such as a person will be suited to different types of applications to varying degrees, and no single biometric parameter will generally be suitable for all possible applications.

While becoming much more pervasive in modern society (and particularly in identification/authentication applications such as for unlocking devices such as smartphones, authenticating for financial transactions or travel, etc.), there are still significant disabilities associated with biometric use.

Firstly, biometric data may be collected at a variety of places, but there is no comprehensive "store" of data which can be accessed by various applications. For example, a smartphone storing user fingerprint data uses that data for authentication of the user (e.g., to unlock the phone) and perhaps authenticate the user for access to a secure element (SE) such as a virtual "wallet" on the phone, but that data (intentionally) cannot be accessed by other applications. In effect, it is purposely sequestered so as to limit the possibility for its surreptitious use. It is also often sequestered from other biometric data for the same person/entity, since possession of two or more biometric data profiles for a given person or entity could seriously jeopardize the efficacy of so-called multi-factor authentication (e.g., an authentication or security model predicated on the assumption that a surreptitious user or process would not be able to authenticate on multiple distinct parameters (e.g., fingerprints, voice print, etc.).

Hence, many existing applications and access models of biometric data involve heavy "siloing" of the data for use in only limited contexts or "realities." Such siloing may also be the (intended or unintended) result of a lack of a sufficiently capable or timely data interface between the various realities or contexts. For example, the distribution of useful biometric data from multiple silos or stores may involve significant latency, especially since (i) each may reside within a different network device/operator domain (e.g., a protected server of Operator A for one type of data, a protected storage or data warehouse of Operator B for another type of data, and so forth). Even using highest previously available data rates such as those of Gigabit Ethernet or LTE-A (aka 4.5G), user experience on many common applications where biometric or other personal profile data is employed would be very poor and latent. Similarly, such prior delivery protocols or systems do not have the pervasive distribution or coverage necessary to support such applications seamlessly (or at all) in certain use cases or geographical areas. Cell coverage is often spotty or highly variable in quality at best, and transitions to other wireless or wired interfaces such as unlicensed Wi-Fi is not seamless if available at all.

Moreover, the dynamic variation or lack of permanence of certain types of biometric data may frustrate its efficacy in certain applications. For example, fingerprints are known to change constantly for many people (over varying time scales), due to any number of factors such as abrasions/cuts, aging, extended submergence in water, etc., and hence depending on the given day when the reference sample is taken, and when the authentication or other use of the data is attempted, such fingerprints may or may not enable such authentication or use. This may also lead to a lack of predictability and loss of user experience; i.e., one day the authentication algorithm making comparison of the stored and contemporaneously sampled data calculates a sufficient similarity or match to enable successful authentication, and another day it does not based on the foregoing variability of the underlying physiological parameter(s). In addition to loss of user experience and frustration, such unpredictability may also present more serious issues; e.g., authentication required for emergency situations such as to unlock a firearms protective device or gain access to a "safe room" during a crime or other emergency may not be enabled, thereby resulting in potential injury or death.

5G New Radio (NR) and NG-RAN (Next Generation Radio Area Network)

NG-RAN or "NextGen RAN (Radio Area Network)" is part of the 3GPP "5G" next generation radio system. The NG-RAN (5G) System architecture is designed to support data connectivity and services offering with higher throughput and lower latency. FIG. 1a shows the 5G architecture 100 as defined in 3GPP TS 23.501 (Fig. 4.2.3-1 thereof).

Network Functions (NFs)

The primary 5G NFs include the following:
1. Access and Mobility Management function (AMF)—Provides for termination of NAS signaling, NAS integrity protection and ciphering, registration and connection and mobility management, access authentication and authorization, and security context management. The AMF has functions analogous to part of the MME functionality of the prior Evolved Packet Core (EPC).
2. Application Function (AF)—Manages application influence on traffic routing, accessing NEF, interaction with policy framework for policy control. The NR AF is comparable to the AF in EPC.
3. Authentication Server Function (AUSF)—Provides authentication server functionality. The AUSF is similar to portions of the HSS from EPC.
4. Network Exposure function (NEF)—Manages exposure of capabilities and events, secure provision of information from external applications to 3GPP network, translation of internal/external information. The NEF is a wholly new entity as compared to EPC.
5. Network Slice Selection Function (NSSF)—Provides for selection of the Network Slice instances to serve the UE, determining the allowed NSSAI, determining the AMF set to be used to serve the UE. The NSSF is a wholly new entity as compared to EPC.
6. NF Repository function (NRF)—Supports the service discovery function, maintains NF profile and available NF instances The NRF is a wholly new entity as compared to EPC.
7. Policy Control Function (PCF)—Provides a unified policy framework, providing policy rules to CP functions, and access subscription information for policy decisions in UDR. The PCF has part of the PCRF functionality from EPC.
8. Session Management function (SMF)—Provides for session management (session establishment, modification, release), IP address allocation & management for UEs, DHCP functions, termination of NAS signaling related to session management, DL data notification, traffic steering configuration for UPF for proper traffic routing. The SMF includes portions of the MME and PGW functionality from EPC.
9. Unified Data Management (UDM)—Supports generation of Authentication and Key Agreement (AKA) credentials, user identification handling, access authorization, subscription management. This comprises a portion of HSS functionality from EPC.
10. User plane function (UPF)—The UPF provides packet routing & forwarding, packet inspection, QoS handling, and also acts as an external PDU session point of interconnect to Data Network (DN). The UPF may also act as an anchor point for intra-RAT and inter-RAT mobility. The UPF includes some of the prior SGW and PGW functionality from EPC.

Moreover, in the 5G NR architecture, control plane (CP) and user plane (UP) functionality is divided within the core network or NGC (Next Generation Core); i.e. the 5G UPF supports UP data processing, while other nodes support CP functions. In some respects, this is a departure from prior architectures; e.g., EPC where the PGW (packet gateway) includes functionality relevant to both the CP and UP such as DHCP functionality and IP address allocation and PCEF functionality. The divided approach of 5G NR advantageously allows for, inter alia, independent scaling of CP and UP functions. Additionally, network slices can be tailored to support different services.

For NG-RAN, 3GPP is currently specifying Release 15. Included therein are so-called "gNBs" (next generation Node B's or eNBs). NG-RAN will provide ultra high-bandwidth, ultra low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC and the NR NGC.

An existing 3GPP LTE/LTE-A/EPC (i.e., 4G or 4.5G system) cannot be updated to support 5G; hence, 3GPP has also defined interworking procedures between such 4G/4.5G and 5G systems. FIG. 1b shows the architecture 101 for interworking between 5GS and EPC/E-UTRAN as defined in TS 23.501 (Fig. 4.3.1-1 thereof), specifically the non-roaming architecture for interworking between the 5GS and the EPC/E-UTRAN. Two different RAN technologies are supported; i.e., E-UTRAN (4G/4.5G) 102, and 5G (NG-RAN) 104.

FIG. 1c (TS 23.501 Fig. 4.3.2-2) similarly illustrates the home-routed roaming architecture for interworking between the 5GS and the EPC/E-UTRAN. The dashed line in FIG. 1c delineates the logic separation between components of the Home PLMN (HPLMN) 112 and the Visited PLMN (VPLMN) 114 for a given UE.

FIG. 1d shows an exemplary service-based architecture 130 under the 5G standards; specifically, for a roaming scenario with local breakout (i.e. the roaming UE interfaces the Data Network (DN) 132 in the visited network (VPLMN) 114, and the UE's HPLMN 112 supports operation with various types of data including (i) subscription information (UDM), (ii) subscriber authentication (AUSF) data, and (ii) UE-specific policies (PCF). Other functions such as network slice selection (NSSF), network access control and mobility management (AMF), data service management (SMF) and application functions (AF) are provided by the VPLMN 114 which the UE is visiting.

In the local breakout scenario of FIG. 1*d*, a given UE typically receives data services of a PLMN completely from the serving (visited) operator's administrative domain. Alternatively, so-called home-routed data services, which provide network functions at least partly from the home operator's administrative domain, with the UE interfacing with the DN in the HPLMN (not shown) versus the DN 132 of the visited network (VPLMN) 114.

In some aspects, Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

NG-RAN also employs a "split" architecture from the perspective of its gNBs; i.e., where gNB/eNB is split into (i) a CU (central or centralized unit) and (ii) a DU (distributed or disaggregated unit) as illustrated in in FIG. 1*e*.

Referring to FIG. 1*e*, the CU 104 (also known as gNB-CU) is a logical node within the NR architecture 100 that communicates with the NG Core 103, and includes gNB functions such as transfer of user data, session management, mobility control, RAN sharing, and positioning; however, other functions are allocated exclusively to the DU(s) 106 (also known as gNB-DUs) per various "split" options described subsequently herein in greater detail. The CU 104 communicates user data and controls the operation of the DU(s) 106, via corresponding front-haul (Fs) user plane and control plane interfaces 108, 110.

Accordingly, to implement the Fs interfaces 108, 110, the (standardized) F1 interface is employed. It provides a mechanism for interconnecting a gNB-CU 104 and a gNB-DU 106 of a gNB 102 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 100, a gNB-DU 106 (or NG eNB-DU) is under the control of a single gNB-CU 104.
Unsatisfied Needs Based on the foregoing, there are several unsatisfied needs relating to biometric data processing, use, and distribution/access. Specifically, in one respect, there is a salient need for a "persistent" biometric presence or profile which can cross realms or domains (whether real or virtual) to maintain user state or other attributes.

Additionally, such persistent biometric data profile or presence would be agile from both geographic and platform perspectives; i.e., as a user moves from one geographic region or locale to another, and/or from one type of device platform to another (e.g., from smartphone to home computer or smart TV or AR glasses/VR headset), including in the context of incipient 5G New Radio implementations and technology.

Moreover, mechanisms by which different biometric data for a given user may be selectively employed are needed, including for verification or identification under varying scenarios or user contexts (and hence minimizing the effects of biometric data "siloing" as previously described).

SUMMARY

The present disclosure addresses the foregoing needs by providing, inter alia, methods and apparatus for biometric data profiling, management, access, and persistence across various domains.

In one aspect, a method for determining an identity of a user of a computerized mobile device is disclosed. In one embodiment, the method includes: determining at least one context of the user; selecting, based on the determined at least one context, a plurality of biometric parameters upon which to base the identity determination; obtaining biometric data specific to the user via at least the computerized mobile device, the obtained biometric data relating to the selected plurality of biometric parameters; evaluating the obtained biometric data relating to the selected plurality of biometric parameters against one or more acceptance criteria; and determining the identity of the user based at least on the evaluating.

In one variant of the method, the determining an identity includes algorithmically verifying or validating the user as who they assert themselves to be to the computerized mobile device, the assertion being conducted via at least a user interface of the computerized mobile device.

In another variant, the determining at least one context includes: obtaining a plurality of data relating to a user's actual or online activity during a prescribed period of time; selecting, based at least in part on the plurality of data relating to the user's actual or online activity during the prescribed period of time, one of a plurality of preexisting context models; and using at least the selected one of the context models as part of the determining the at least one context.

In one implementation, the selecting, based on the determined at least one context, a plurality of biometric parameters upon which to base the identity determination, includes: accessing configuration data for the computerized mobile device; and based at least on the accessed configuration data, identifying a possible population of biometric parameters from which to select the plurality of biometric parameters.

In another implementation, the prescribed time period comprises a window of time extending from a past time to a then-current time; the obtaining the plurality of data relating to the user's actual or online activity during the prescribed period of time includes obtaining the plurality of data relating to the user's actual or online activity during the window; and the selecting, based at least in part on the plurality of data relating to the user's actual or online activity during the prescribed period of time, one of a plurality of preexisting context models includes: (i) identifying a plurality of candidate context models based at least in part on the obtained plurality of data relating to the user's actual or online activity during the window; (ii) assigning a probability or score to each of the candidate context models based at least; and (iii) selecting the one of the candidate context models with a highest probability or score as the one of the plurality of pre-existing context models.

In yet another variant, the selecting, based on the determined at least one context, a plurality of biometric parameters upon which to base the identity determination, includes selecting each of the plurality of biometric parameters based on a pre-assigned reliability or confidence level associated with the determined at least one context.

In another aspect, a method of protecting a plurality of biometric data associated with a user is disclosed. In one embodiment, the plurality of biometric data is useful in one or more computer programs of a first type, and one or more computer programs of a second type, and the method includes: characterizing the one or more computer programs of the first type as to a first subset of the plurality of biometric data needed to support operation thereof; characterizing the one or more computer programs of the second type as to a second subset of the plurality of biometric data needed to support operation thereof, the second subset being at least partly different than the first subset; identifying one or more types of the plurality of biometric data that are not part of the first subset; identifying one or more types of the plurality of biometric data that are not part of the second subset; using the identified one or more types of the plurality of biometric data that are not part of the first subset to secure access to the plurality of biometric data that are part of the first subset; and using the identified one or more types of the plurality of biometric data that are not part of the second subset to secure access to the plurality of biometric data that are part of the second subset.

In one variant, the method further includes resource locking of the one or more computer programs of the first type with respect to the one or more computer programs of the second type.

In one implementation, the resource locking of the one or more computer programs of the first type with respect to the one or more computer programs of the second type includes preventing simultaneous access to the plurality of biometric data by the one or more computer programs of the first type and the one or more computer programs of the second type. The preventing simultaneous access to the plurality of biometric data by the one or more computer programs of the first type and the one or more computer programs of the second type may include for example preventing access to the plurality of biometric data via a second data session associated with the one or more computer programs of the second type while a pre-existing first data session associated with the one or more computer programs of the first type persists.

In another implementation, the resource locking of the one or more computer programs of the first type with respect to the one or more computer programs of the second type includes preventing simultaneous access to the plurality of biometric data by the one or more computer programs of the first type and the one or more computer programs of the second type in cases where the one or more the one or more computer programs of the first type and the one or more computer programs of the second type are executing on different operating systems of respective ones of different computerized devices.

In yet another implementation, the plurality of biometric data is maintained in at least one computerized database, and the method further includes accessing the plurality of biometric data needed to support operation of the one or more computer programs of the first type via an application programming interface (API) associated with the at least one computerized database, the accessing comprising the one or more computer programs of the first type generating an API call and transmitting the API call to a server process associated with the at least one computerized database via a 5G (Fifth Generation New Radio) wireless bearer; and the server process performs the resource locking.

In another variant of the method, the characterizing the one or more computer programs of the first type as to a first subset of the plurality of biometric data needed to support operation thereof includes accessing at least one of: (i) a registry associated with the one or more computer programs of the first type, and/or (ii) an application programming interface (API) associated with the one or more computer programs of the first type.

In yet another aspect, a method of operating a wireless infrastructure to optimize biometric application support is disclosed. In one embodiment, the wireless infrastructure has at least one controller process and a plurality of distributed processes in data communication with the controller process, and the method includes: characterizing required biometric application support for a biometric application operative to execute on a mobile wireless device served by at least one of the distributed processes; based at least on the characterizing, dynamically configuring an allocation of a plurality of functions associated with the PHY (physical layer) and at least one layer above the PHY provided by the at least one of the distributed processes and the central process, the dynamically configuring optimizing said support in at least one aspect.

In one variant of the method, the characterizing required biometric application support for the biometric application includes determining at least one QoS (quality of service) related requirement associated with the biometric application.

In another variant, the characterizing required biometric application support for the biometric application includes: (i) identifying at least one source or sink process associated with the biometric application; (ii) determining at least one data bandwidth requirement associated with the at least one source or sink process; and (iii) determining a temporal latency resulting from the data bandwidth requirement for the at least one source or sink process.

In one implementation, the dynamically configuring includes identifying one of a plurality of predetermined functional allocations with a highest level of performance relative to the determined temporal latency.

In another variant of the method, the characterizing required biometric application support for the biometric application includes: (i) identifying at least one source or sink process associated with the biometric application; and (ii) determining that the identified at least one source or sink process includes a process served by one of the plurality of distributed processes other than the at least one of the plurality of distributed processes; and wherein the dynamically configuring includes identifying one of a plurality of predetermined functional allocations which optimizes inter-distributed process data communication performance.

In another variant, the identifying one of a plurality of predetermined functional allocations which optimizes inter-distributed process data communication performance includes implementing a functional allocation wherein all but RU (Radio Unit) functions are maintained within the at least one and the other plurality of distributed processes.

In a further aspect of the disclosure, a biometric data storage architecture is provided. In one embodiment, the architecture includes: at least one centralized biometric data storage entity, the at least one biometric data storage entity comprising a plurality of biometric data relating to each of a plurality of individuals; a plurality of distributed biometric data storage entities in data communication with the at least one centralized biometric data storage entity; and at least one biometric data management process, the at least one biometric data management process in data communication with each of (i) the plurality of distributed biometric data storage entities, and (ii) the at least one centralized biometric data storage entity, the at least one biometric data management process configured to selectively and dynamically allocate portions of the plurality of biometric data to one or more of the plurality of distributed biometric data storage entities based at least in part on an association of one or more of the users with a particular data network node or portion of a data network.

In one variant of the architecture, the selective and dynamic allocation of portions of the plurality of biometric data to one or more of the plurality of distributed biometric data storage entities is further based at least in part on a configuration of one or more augmented reality (AR) or virtual reality (VR) application computer programs configured to execute on a computerized user device of at least one of the associated one or more users.

In another variant, the architecture is further configured to: utilize a plurality of manifests associated with at least: (i) a portion of the plurality of distributed biometric data storage entities, and (ii) the at least one centralized biometric data storage entity, the manifests each comprising data indicate of the biometric data stored within its respective storage entity; cause distribution of the plurality of manifests at least to others of (i) a portion of the plurality of distributed biometric data storage entities or processing entities associated therewith, and (ii) the at least one centralized biometric data storage entity or the at least one biometric data management process; and cause protection of the integrity of at least a portion of the plurality of manifests using at least one blockchain.

In another aspect of the disclosure, a computerized wireless access node apparatus configured for providing wireless access to a plurality of computerized wireless-enabled mobile devices via radio frequency (RF) spectrum is disclosed. In one embodiment, the computerized wireless access node includes: a wireless interface configured to transmit and receive RF waveforms in the spectrum portion; digital processor apparatus in data communication with the wireless interface; and a storage device in data communication with the digital processor apparatus and comprising at least one computer program. In one variant, the access node apparatus is a DU entity within a 5G NR wireless network architecture.

In one variant, the at least one computer program is configured to, when executed by the digital processor apparatus, communicate data relating to biometric attributes with a corresponding process executing on either or both of (i) a mobile device (e.g., 5G enabled UE), and (ii) a corresponding process executing on a 5G NR CU within the same or different gNB.

In another aspect of the disclosure, network apparatus for use within a first network is disclosed. In one embodiment, the network apparatus resides within a 5G NR core and includes a centralized biometric analysis entity (BAE) configured to interface with both (i) a centralized biometric data store or database, and (ii) a plurality of local/distributed BAE processes. In one variant the distributed BAE processes are disposed further out towards the edge of a 5G NR architecture (e.g., within RAN/gNB components thereof) and selectively store various subsets of the master store/database data depending on one or more factors such as biometric support required, UE association, mobility, and other factors.

In an additional aspect of the disclosure, computer readable apparatus is described. In one embodiment, the apparatus includes a storage medium configured to store one or more computer programs. In one embodiment, the apparatus includes a program memory or HDD or SSD on a computerized controller device. In another embodiment, the apparatus includes a program memory, HDD or SSD on a computerized access node.

In a further aspect, a wireless network architecture is disclosed. In one embodiment, the architecture is a 5G NR-based architecture, and is configured to perform one or both of (i) selective and dynamic CU/DU split management in support of biometric profile management, distribution and persistence, and/or (ii) selective and dynamic utilization of network slicing capability in support of the foregoing functions.

In still another aspect, an algorithmic engine is disclosed. In one embodiment, the engine includes a plurality of computer-executable instructions which are configured to, when executed, algorithmically analyze various aspects of user state and action, including sensor data, to determine user/device context.

In another aspect, a memory device is disclosed. In one embodiment, the memory device is a memory array optimized for storage of BAE module processed (output) and source data. In another embodiment, the memory array is optimized for use within a BDB for storing and securing personal biometric data.

In another aspect, an integrated circuit (IC) is disclosed. In one embodiment, the IC is an application-specific IC (ASIC) which includes BAE processing logic.

These and other aspects shall become apparent when considered in light of the disclosure provided herein.

DETAILED DESCRIPTION

Figure 1A:
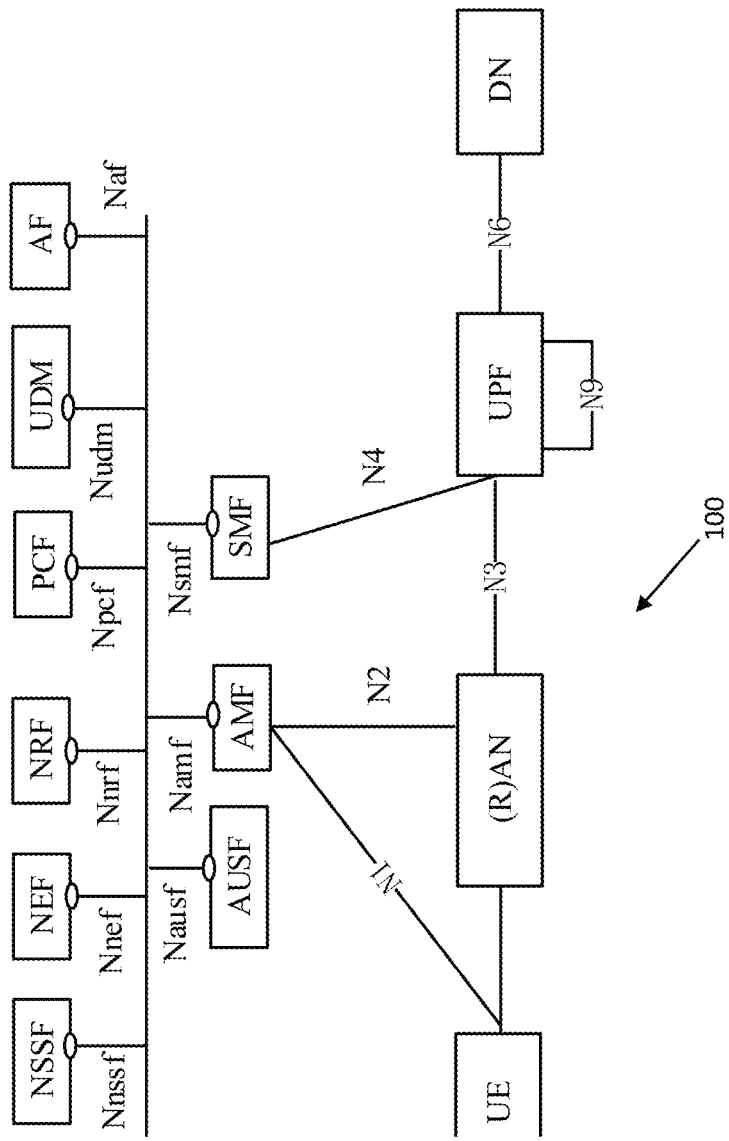
FIG. 1*a* is a functional block diagram of a prior art 5G system architecture and the various components thereof.
Figure 1B:
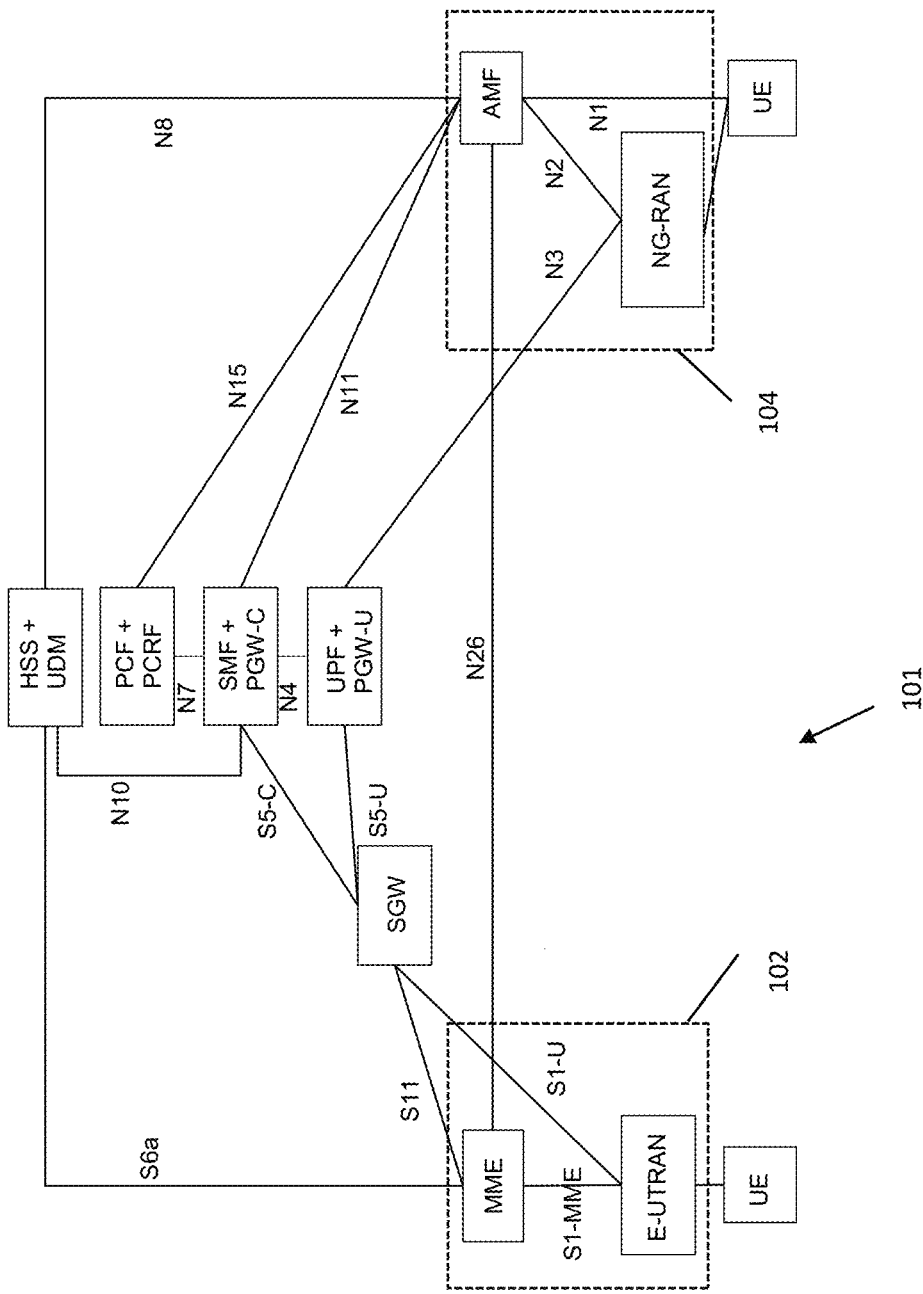
FIG. 1*b* is a block diagram showing the extant architecture for interworking between 5GS and EPC/E-UTRAN as defined in 3GPP TS 23.501 (Fig. 4.3.1-1 thereof), specifically the non-roaming architecture for interworking between the 5GS and the EPC/E-UTRAN.

Reference is now made to the drawings wherein like numerals refer to like parts throughout.

As used herein, the term "access node" refers generally and without limitation to a network node which enables communication between a user or client device and another entity within a network, such as for example a 5G NR gNB, an LTE eNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" may include, but are not limited to, mobile devices such as handheld computers, PDAs, personal media devices (PMDs), tablets, "phablets", smartphones, and vehicle infotainment systems or portions thereof, as well as set-top boxes (e.g., DSTBs), gateways, modems, personal computers (PCs), and minicomputers, whether desktop, laptop, or otherwise, VR headsets or other apparatus, and AR glasses, headsets, or other apparatus, and/or smart TVs.

As used herein, the term "computer program" or "software" is meant to include any sequence or human or machine cognizable steps which perform a function. Such program may be rendered in virtually any programming language or environment including, for example, C/C++, Fortran, Python, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, and other wireless data standards. (as applicable).

As used herein, the terms "5G NR, "5G," and "New Radio" refer without limitation to 3GPP Release 15-17 and TS 38.XXX Series and subsequent or related standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), GDDR6, 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, GPUs (graphics processing units), secure microprocessors, and application-specific integrated circuits (ASICs). Such digital processors may be contained on a single unitary IC die, or distributed across multiple components.

As used herein, the terms "MNO" or "mobile network operator" refer to a cellular (e.g., 4/4.5/5G 3GPP), satellite phone, or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, wireless networks, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, 5G NR, LTE/LTE-A/LTE-U/ LTE-LAA, WAP, SIP, UDP, FTP, RTP/RTCP, H.323, etc.).

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, SSDs, USB flash drives, DVR devices, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" can mean any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

Overview

In one exemplary aspect, the present disclosure provides improved methods and apparatus for "seamless" biometric data processing, use and distribution/access.

In an exemplary embodiment, a 5G NR-based network architecture is provided which allows, inter alia, ultra-low latency and effectively user-imperceptible biometric data use for e.g., authentication and maintenance of user state across multiple domains via multiple constituent user devices (e.g., UEs). The network architecture includes both (i) a distributed biometric database (BDB) model wherein relevant biometric data for individuals/UEs is intelligently cached in various portions of the distributed database, and (ii) centralized and local BAEs (biometric analytics entities) which manage the aforementioned intelligent caching, as well as network configuration using one or both of 5G NR network "slicing" and CU/DU split options to optimize end-user biometric-related applications such as those providing identification/authentication, AR functions, VR functions or yet others.

In one implementation, the BAEs each include a number of different functional modules or "engines," including (i) a user biometric context module (CM), (ii) a CU/DU split module, (iii) a biometric analytics (BA) module, and (iv) a network slicing module. In one embodiment, these modules comprise a plurality of computer programs configured to utilize inputs from user devices and/or others of the BAE modules to determine optimized biometric support configurations for the network, and maintain the desired biometric data distribution and use functions (e.g., persistent biometric profiling across one or more domains). For example, the context module (CM) accesses data from a user's client device(s) and/or other devices such as third-party sensors or mobile devices to determine their current context, and structure biometric data processing and distribution (including via the aforementioned architecture) based thereon.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access points (e.g., DUs) associated with e.g., an operator managed network (e.g., 5G NR system architecture having digital networking capability, IP delivery capability, and a plurality of UE's or other client or end-user devices), the general principles and advantages of the disclosure may be extended to other types of radio access technologies ("RATs"), networks and architectures that are configured to deliver digital data (e.g., biometric data or biometric-related application data). Such other networks or architectures may be broadband, narrowband, or otherwise, the following therefore being merely exemplary in nature.

It will also be appreciated that while described generally in the context of a network providing service to a customer or consumer or end user or subscriber, the present disclosure may be readily adapted to other types of environments including, e.g., outdoors, commercial/retail, or enterprise domain (e.g., businesses), or even governmental uses. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while particular implementations may be described in the context of licensed or unlicensed spectrum, it will be appreciated by those of ordinary skill given the present disclosure that various of the methods and apparatus described herein may be applied to spectrum or bandwidth within the other context, or combinations of licensed and unlicensed spectrum (including within the same application).

Other features and advantages of the present disclosure will immediately be recognized by persons of ordinary skill in the art with reference to the attached drawings and detailed description of exemplary embodiments as given below.

System Architecture—

Figure 2:
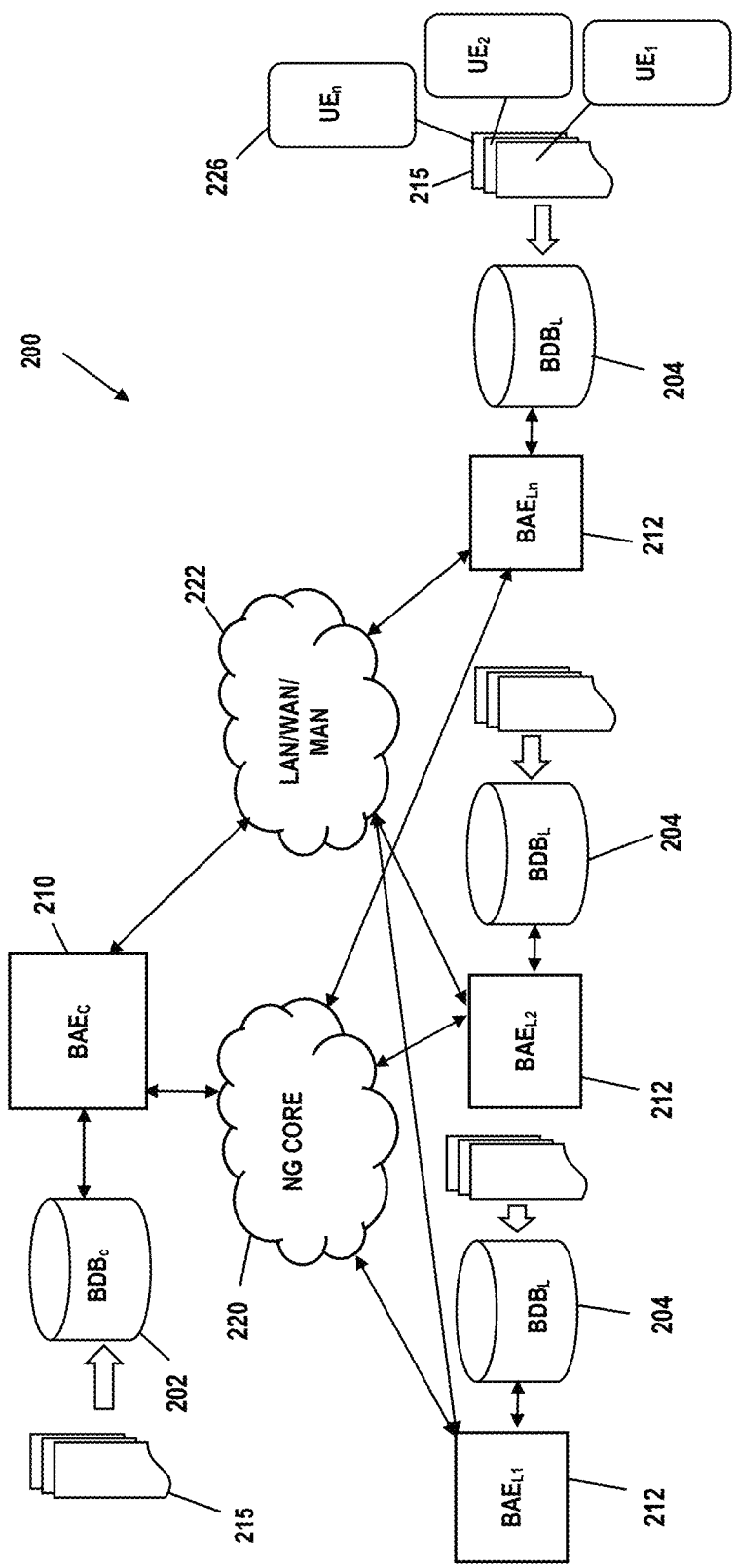
FIG. 2 is a functional block diagram of one embodiment of a biometric profile data architecture according to the present disclosure.

Referring now to FIG. 2, one exemplary embodiment of the persistent biometric profile system architecture 200 according to the present disclosure is described in detail. It will be appreciated that while shown generally in the abstract, the architecture of FIG. 2 can be applied to any number of network topologies or types, including for example MNO/MVO cellular networks and MSO-based networks.

As shown in FIG. 2, the architecture 200 comprises one or more "centralized" biometric data storage repositories (biometric databases or $BDB_c$'s) 202, as well as a number of local or "edge" data warehouses or repositories or $BDB_L$'s 204. The terms "centralized" and "edge" and "local" as used in the present context in no way require particular physical or geographic locations for these storage entities, but rather refer to their placement within the architecture 200 and relative to one another. Functionally, the centralized storage entities 202 may include both (i) a greater breadth or diversity of user/user device coverage (i.e., data for more users/devices), and (ii) a greater diversity of types of biometric data for individual ones of the users (and in a corresponding fashion a greater diversity of data for possible applications associated with individual user devices), as compared to the edge/local repositories 204.

Also included in the architecture 200 of FIG. 2 are one or more BAE (biometric analytics engine) entities 210, 212, which as described in greater detail subsequently herein, perform a number of different functions relating to (a) context determination of users/user devices, (b) biometric profile determination (including based on context), and (c) profile management and distribution, including across different network slices or portions. The BAE entities 210, 212 may vary in configuration and capability (i.e., may be heterogeneous, even within the same sub-portion of the architecture 200), including in their functions relative to other network entities or processes (e.g., may act as "server" or "master" processes to certain entities, and "clients" or "minions" to others) as described in greater detail subsequently herein.

The BAE entities 210, 212 communicate with the centralized and/or local data storage repositories 202, 204 as needed in order to fulfill the foregoing functions (a)-(c) (and others), as described in greater detail subsequently herein. In one implementation, the BAE entities comprise both a centralized BAE ($BAE_c$) 210 and local BAE's ($BAE_L$) 212 as shown in FIG. 2, although many other configurations are possible as discussed in greater detail below (including in one variant use of only a unified central BAE 210 or use of only distributed or local BAE's 212).

In one variant, the BAE entities each maintain a current manifest or listing of data types 215 maintained by the various storage locations 202, 204, the latter which may vary dynamically as a function of time or other parameters based on for example user/user device location/association with a given network node, user/user device applications, and other considerations. In one implementation, one of the centralized storage locations 202 includes BAE functionality which is tasked with maintaining the manifests for all storage locations within a prescribed network portion (or the network as a whole), and distributing them via inter-process communications via interposed communication channels (which may be on the 5G NR bearer/core 220 itself, or on other channels such as WLAN, DOCSIS modem, fiber delivery, millimeter wave, LAN, or other communication modality) 222. In operation, however, the inter-process (inter-node) transfer of the various elements on a manifest are carried by the 5G NR bearer and core 220 so as to meet latency and performance requirements including maintenance of high quality user experience.

By analogy, in one implementation, the "files" or elements listed on the various manifests 215 are somewhat akin to content files or "chunks" used for accounting/distributing content elements such as movies or videos (e.g., playlists), yet may each be heterogeneous in nature as required (e.g., some may be .wav or similar files, some may be imagery files such as .jpg or .tiff, some may be yet other formats, each element relating in some capacity to maintenance of a user's/user device's persistent biometric/applications profile. In one approach, each of the manifests 215 are constructed and maintained on a per-user or per-device basis, such that all elements associated with a given manifest relate to a specific user or device 226 as shown. The user's/device's identity may be maintained in secrecy (e.g., protected by a one-way cryptographic hash or other mechanism which allows for unique identification of the user/device but which cannot be read or determined by any surreptitious process).

In one variant, the central (and local) repositories are each physically and/or logically partitioned so as to maintain completely "firewalled" storage locations such that no user biometric data (or associated device data) is co-mingled with that of other users. Such partitioning may include one or more of encryption, physically separate devices, software interlocks, or any other means of frustrating unintended or unauthorized access of data storage locations. See also discussion of FIG. 11 herein.

Figure 1C:
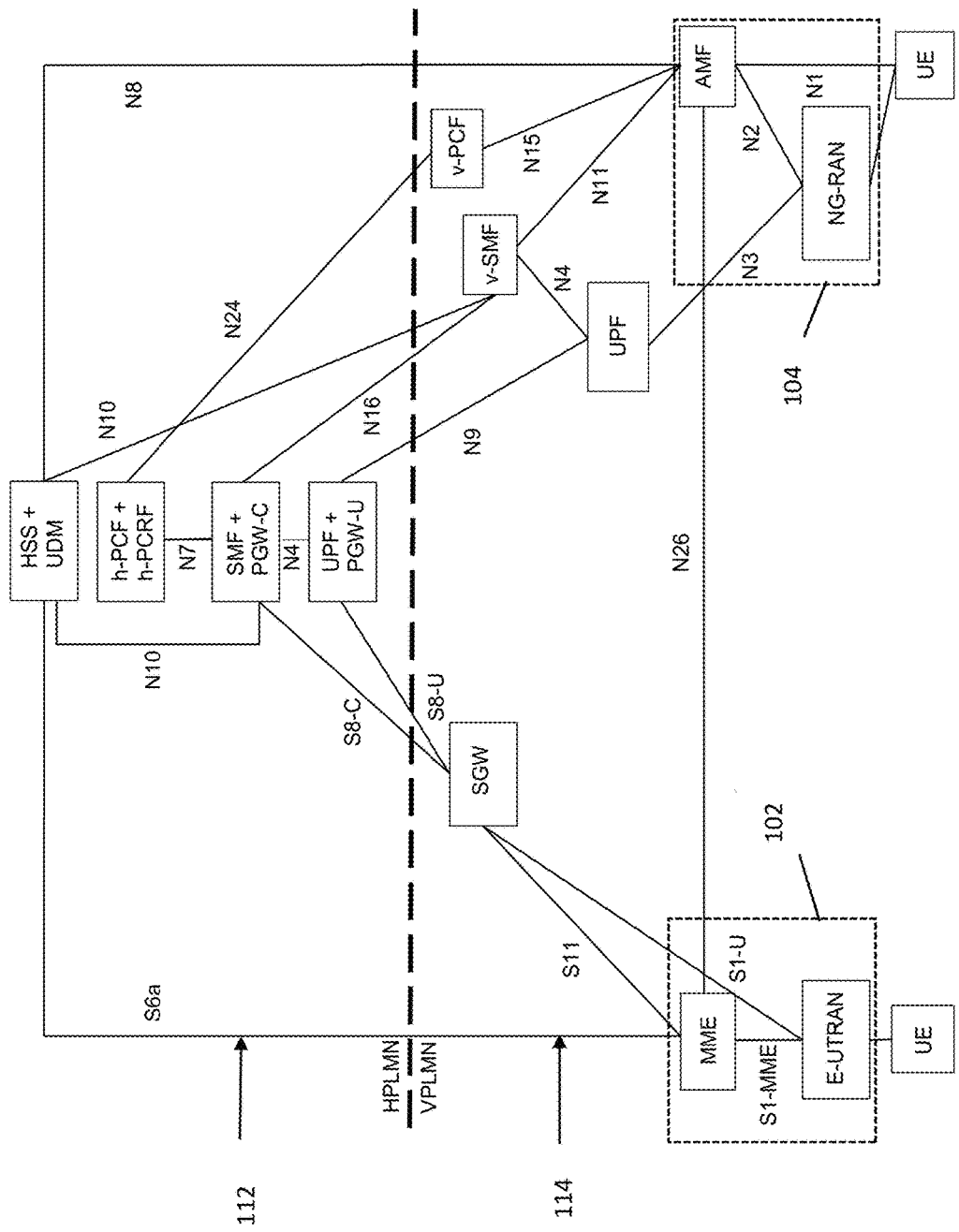
FIG. 1*c* is a block diagram from 3GPP TS 23.501 (Fig. 4.3.2-2) illustrating illustrates the home-routed roaming architecture for interworking between the 5GS and the EPC/E-UTRAN.
Figure 1D:
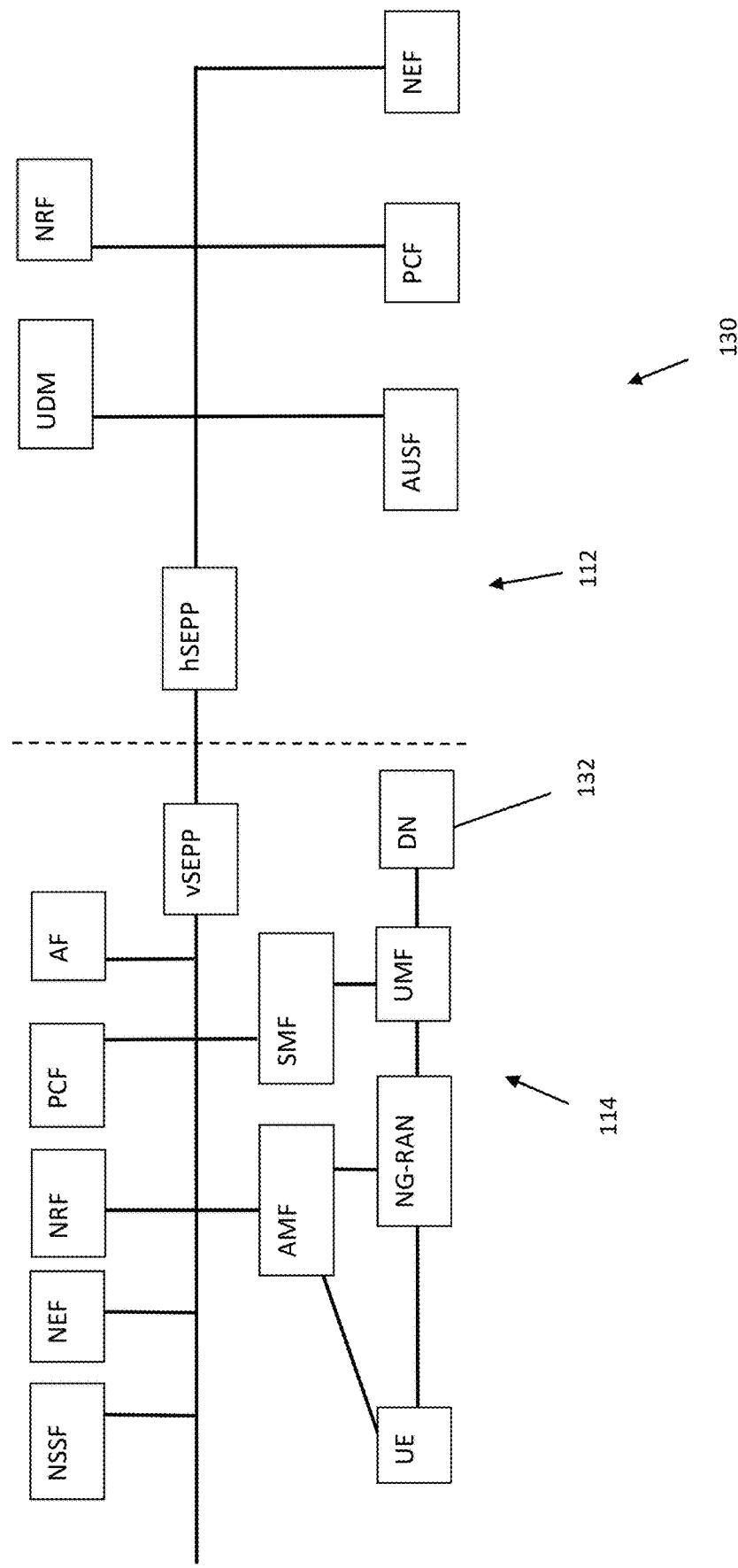
FIG. 1*d* is a block diagram illustrating the relationship of various 5G network components within a Visited Public Land Mobile Network (VPLMN) and a Home PLMN (HPLMN) according to a roaming "breakout" scenario.
Figure 1E:
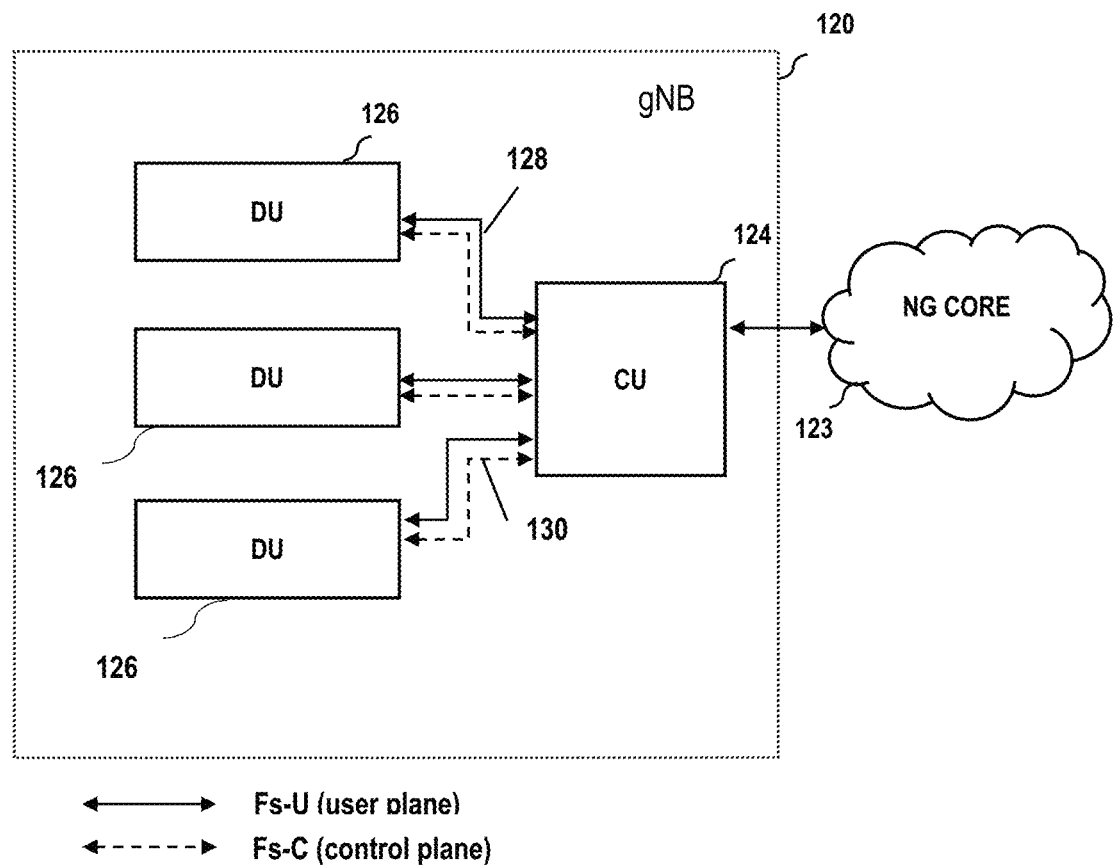
FIG. 1*e* is a block diagram of a prior art gNB architecture including CU and multiple DU.

In operation, periodic or event-driven updates to the various BDB's are made via the foregoing mechanism(s) so as to keep all BDB entities 202, 204 updated over time (e.g., as users/device migrate from one service RAN or area to another, invoke or tear down biometric-related applications such as AR/VR applications, etc.). As shown in FIG. 1c, UE's/users within the EPC/5G NR RANs will in one implementation have a home network or HPLMN, and one or more visited PLMNs (VPLMNs) depending on for example where and how they associate with a given RAN. In one variant, the BAEc 210 and BDBm are implemented with the user's (UE's) HPLMN, such as by an MNO or MSO maintaining the relevant biometric-related data for its subscribers.

$BAE_x$ Architecture—

Figure 3:
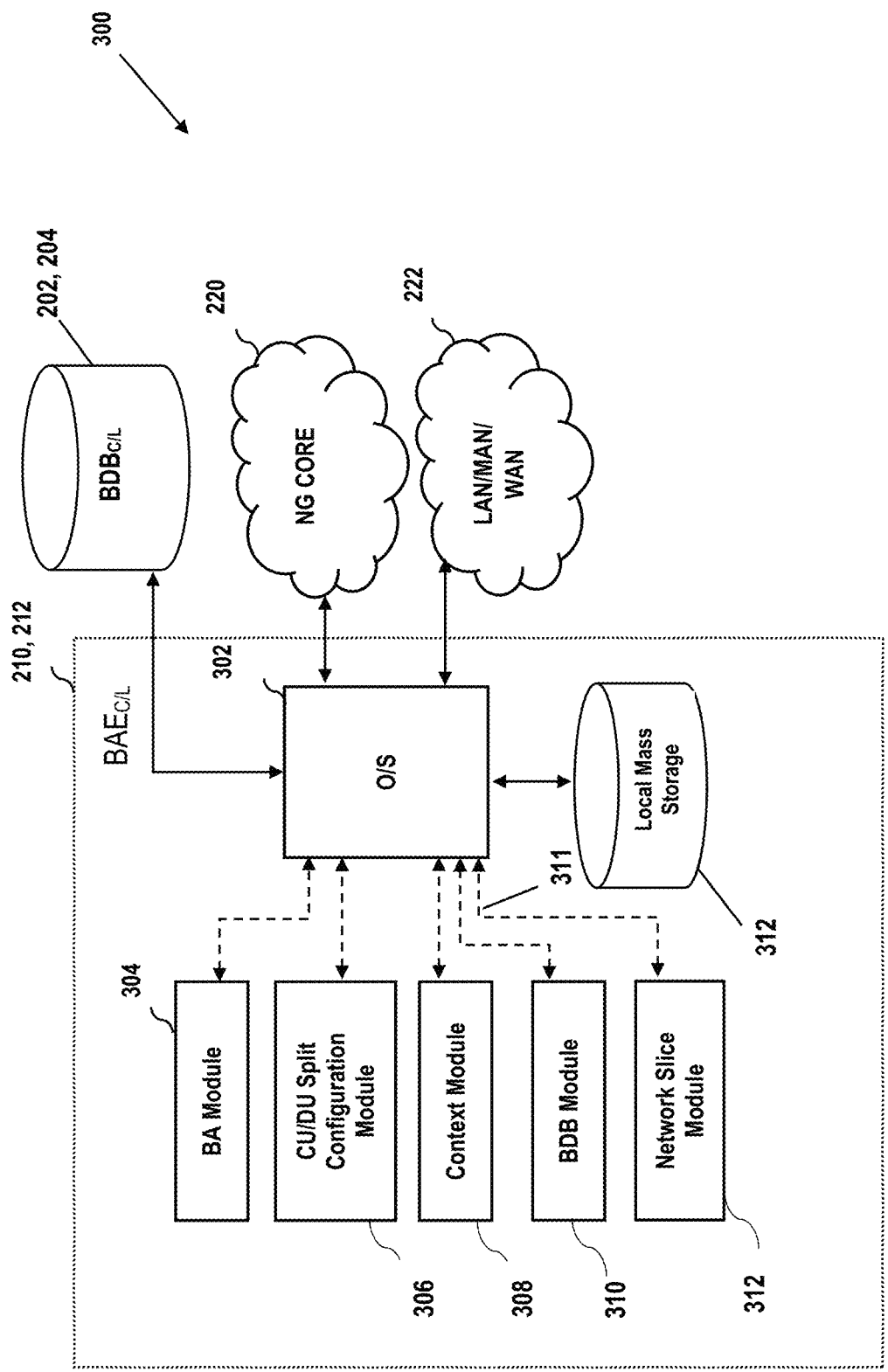
FIG. 3 is functional a block diagram of one embodiment of a computerized biometric analysis entity (BAE) profile used within the architecture of FIG. 2.

Referring now to FIG. 3, one embodiment of an architecture 300 of a BAE 210, 212 of FIG. 2 is shown and described in detail. As illustrated, the architecture 300 includes an operating system (O/S) 302 of the BAE, which is logically communicative 311 (e.g., via inter-process communications of the type known in the art) with a plurality of sub-processes or modules/engines 304-310 which perform various constituent functions and algorithmic calculations in support of the larger distributed biometric profile functions described herein.

BA Module

In the exemplary embodiment, the BA (biometric analytics) module 304 includes a plurality of sub-routines which, when invoked by the O/S 302, perform necessary biometric data analysis in support of given higher level operation. For example, facial recognition via imagery present within the biometric database(s), such as that obtained from a user at signup, and data currently obtained from a sensor on the user's UE (e.g., digital camera or "camera roll" functionality) can be performed by one set of sub-routines of the BA module. Likewise, fingerprint, voiceprint, retinal scan, and other types of biometric-based analyses are performed by the exemplary BA module 304. Such operations performed by the BA module act in support of, inter alia, comparison and scoring of data sets for authentication/identification, context template/model selection, hypothesis testing, and user "persistent" profile generation, as described further elsewhere herein.

As such the BA module can be considered a tool or asset which can be called by other modules/routines to perform discrete tasks required to support the higher level operations.

CU/DU Split Module

Another module of the exemplary BAE architecture 300 is the CU/DU split configuration module 306, which in the illustrated embodiment is tasked with executing a number of sub-routines to evaluate and identify an optimized CU-DU functional split based on a number of factors including without limitation (i) type of biometric application invoked (e.g., VR, AR), (ii) association of the user (UE) with a given DU within the local RAN/gNB, (iii) user mobility (or lack thereof) during the invoked application(s); (iv) whether the user is within the HPLMN or a VPLMN.

Distributed gNB Architectures

Referring now to FIGS. 4a-4e, various embodiments of the distributed (CU/DU) gNB architecture supporting biometric profile access and distribution according to the present disclosure are described.

Figure 4A:
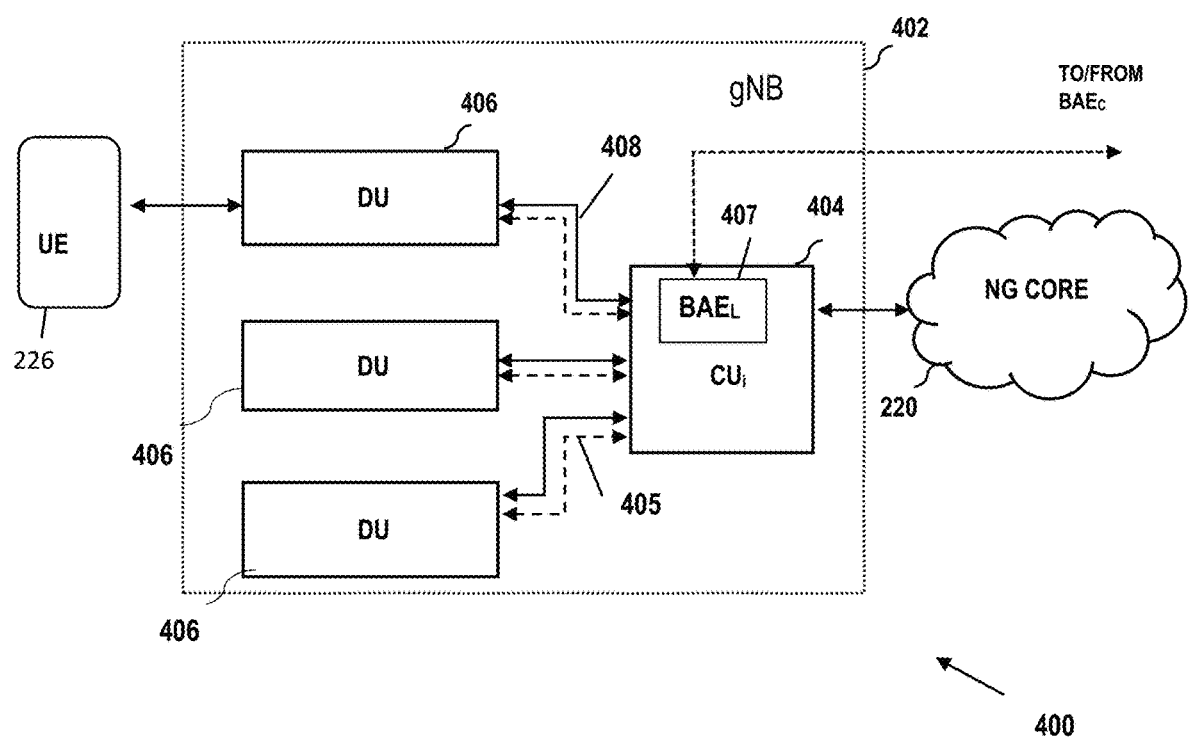
FIG. 4a is a functional block diagram of a first exemplary embodiment of a gNB architecture according to the present disclosure, including "intelligent" biometric-enabled CU (CUi) and multiple DUs.

As shown in FIG. 4a, a first architecture 400 includes a gNB 402 having an "intelligent" CU (CUi) 404 and a plurality of DUs 406. As described in greater detail elsewhere herein, the CUi entities include BAE's of the type described above and accordingly are enabled to varying degrees (based on configuration) to permit efficient inter-process signaling and biometric data distribution and access in support of persistent biometric profile functionality, whether autonomously or under control of another logical entity (e.g., another BAE in a supervisory role such as the $BAE_c$ 210 in FIG. 2).

In one configuration, the individual DUs 406 in FIG. 4a communicate data and messaging with the CUi 404 via interposed physical communication interfaces 408 and logical interfaces 405. As previously described, such interfaces may include a user plane and control plane, and be embodied in prescribed protocols such as F1AP. It will be noted that in this embodiment, one CUi 404 is associated with one or more DUs 406, yet a given DU is only associated with a single CUi. Likewise, the single CUi 404 is communicative with a single NG Core 220, such as that operated by an MNO or MVNO. Each NG Core 220 may have multiple gNBs 402 associated therewith.

As shown, the BAE 407 comprises minion or local/distributed function disposed within the CUi 404, and is in logical communication with a counterpart master or centralized portion or function disposed e.g., within the network core 220 or other as shown in FIG. 2. The BAE 407 is configured to, among other things, conduct inter-process communications with one or more applications executing on the target UE (e.g., VR, AR, or other applications requiring or enabled to utilize biometric profile data) to assist in context determination by the supervisory BAE (e.g., the $BAE_c$ of FIG. 2), as well as persistence of the biometric profile data within the target UE (i.e., delivery of biometric data in support of the profile and related functions invoked on the UE).

Note that in the architecture 400 of FIG. 4a, the DUs 406 and the UE are merely "dumb" (aka non-enhanced) devices; only the controller (CUi) is enhanced with BAE capability. This approach has the simplicity of using COTS UE and DU processes, but is limited to some degree in that the biometric data/persistent profile and manipulation of apps or processes on the UE is limited to, in effect, the configuration of those apps/processes. As such, the UE can only generate biometric-related data, and conversely use it (e.g., upon receipt from the RAN), to the extent of its existing capabilities.

Figure 4B:
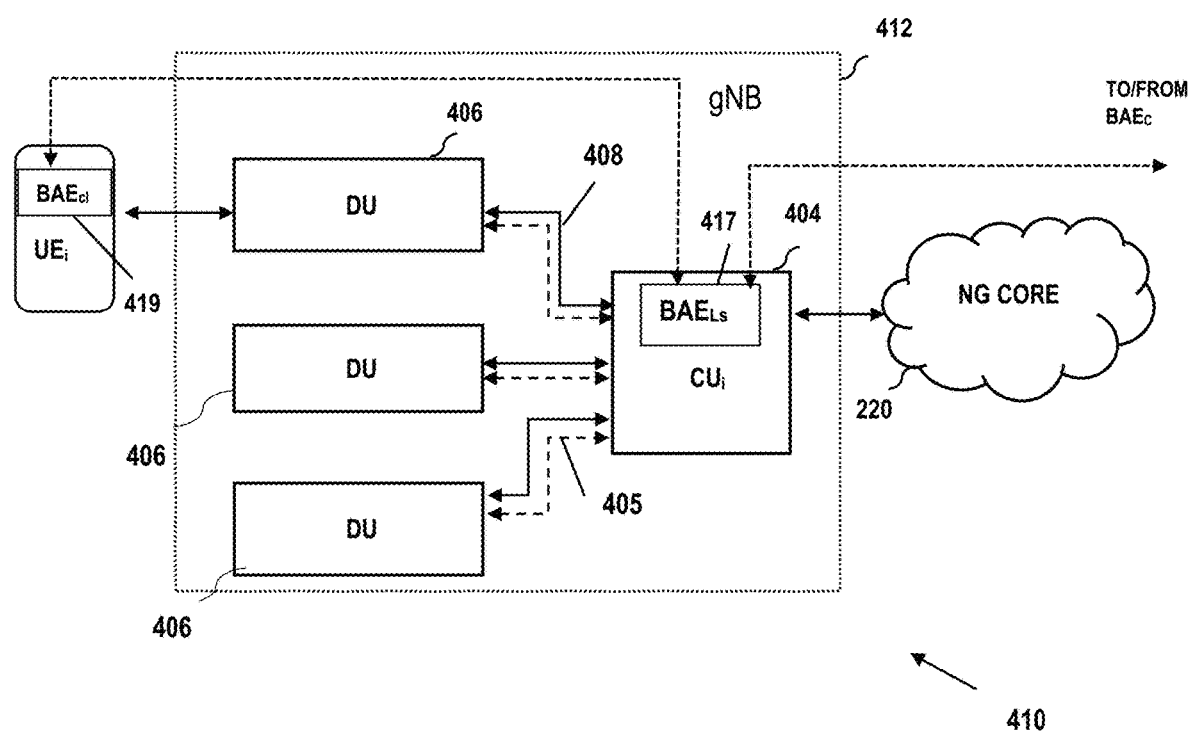
FIG. 4b is a functional block diagram of a second exemplary embodiment of a gNB architecture according to the present disclosure, including "intelligent" biometric-enabled CU (CUi) and biometric-enabled UE (UEi).

As shown in FIG. 4b, a second architecture 410 includes a gNB 412 having an "intelligent" CU (CUi) 404 and a plurality of DUs 406. As described in greater detail elsewhere herein, the CUi entities include BAE's of the type described above and accordingly are enabled to varying degrees (based on configuration) to permit efficient inter-process signaling and biometric data distribution and access in support of persistent biometric profile functionality, whether autonomously or under control of another logical entity (e.g., another BAE in a supervisory role such as the $BAE_c$ 210 in FIG. 2).

In one configuration, the individual DUs 406 in FIG. 4b communicate data and messaging with the CUi 404 via interposed physical communication interfaces 408 and logical interfaces 405. As previously described, such interfaces may include a user plane and control plane, and be embodied in prescribed protocols such as F1AP. In this embodiment, one CUi 404 is associated with one or more DUs 406, yet a given DU is only associated with a single CUi. Likewise, the single CUi 404 is communicative with a single NG Core 220, such as that operated by an MNO or MVNO.

As shown, the BAELS 417 of FIG. 4b comprises a server or master portion or function disposed within the CUi 404, and is in logical communication with a counterpart client or minion portion or function 419 disposed on the target UE. The client/minion 409 is configured to, among other things, conduct inter-process communications with one or more applications executing on the target UE (e.g., VR, AR, or other applications requiring or enabled to utilize biometric profile data) to assist in context determination by the supervisory BAE (whether the $BAE_{Ls}$ 417, or a centralized BAE (e.g., the $BAE_c$ of FIG. 2), as well as persistence of the biometric profile data within the target UE (i.e., delivery of biometric data in support of the profile and related functions invoked on the UE). The $BAE_{cl}$ of the target $UE_i$ may be installed at time of manufacture thereof, or subsequently downloaded from e.g., an MVO/MVNO sponsored site, or application portal such as "Google Play."

Note that in the architecture 410 of FIG. 4b, the DUs 406 are merely "dumb" (aka non-enhanced) DUs; only the controller (CUi) is enhanced with BAE capability.

Figure 4C:
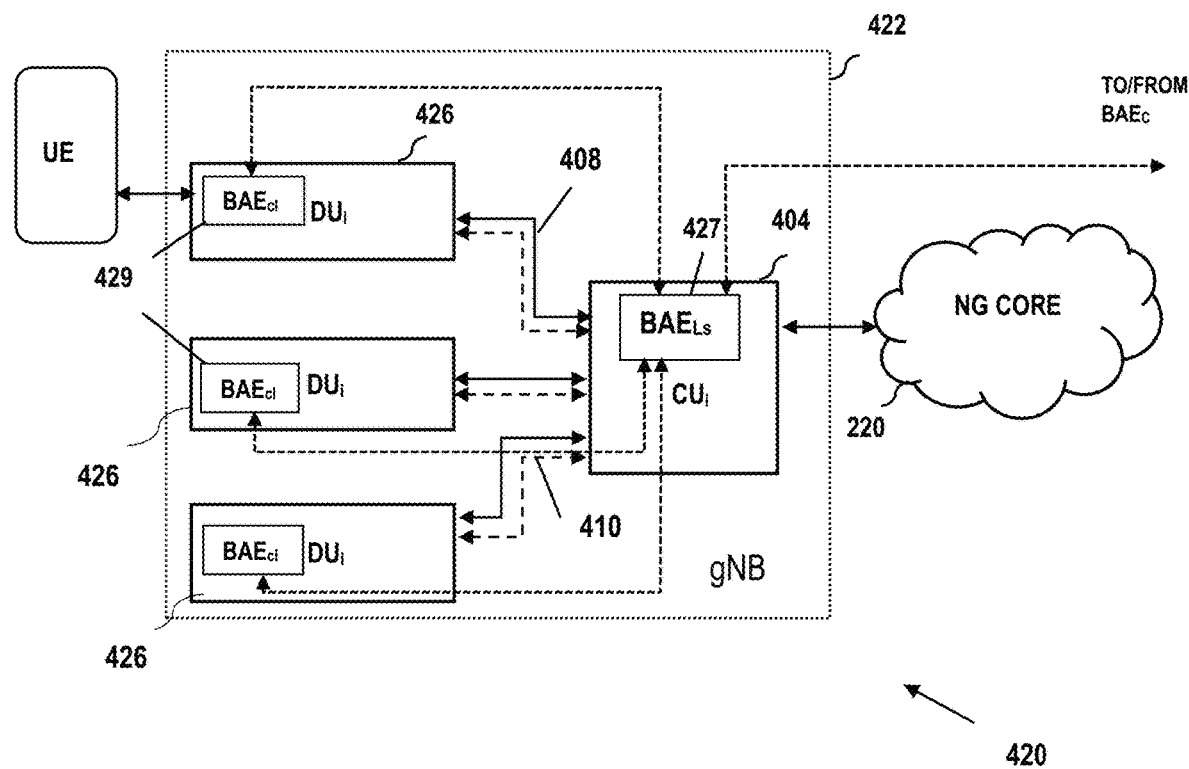
FIG. 4c is a functional block diagram of a third exemplary embodiment of a gNB architecture according to the present disclosure, including "intelligent" biometric-enabled CU (CUi) and multiple intelligent DUs (DUis).

In the architecture 420 of FIG. 4c, another exemplary configuration is shown, wherein the "dumb" DUs of FIGS. 4a and 4b have been replaced with enhanced DUs (DUi's) 426 each having a client or minion portion/function 429 of the BAE within the gNB 422. Also, the target UE maintains no BAE process of its own in this configuration; this carries the advantage of being able to use COTS or unmodified UE devices and none-the-less engage in supported persistent biometric profile applications. This is accomplished by the $BAE_{cl}$ processes on the DUi devices 426; the relevant biometric-enabled apps on the target UE (e.g., VR or AR app) communicate directly via the 5G RAN air interface with the $BAE_{cl}$ processes 429, the latter which are in logical communication with the $BAE_{Ls}$ process on the CUi 404.

Figure 4D:
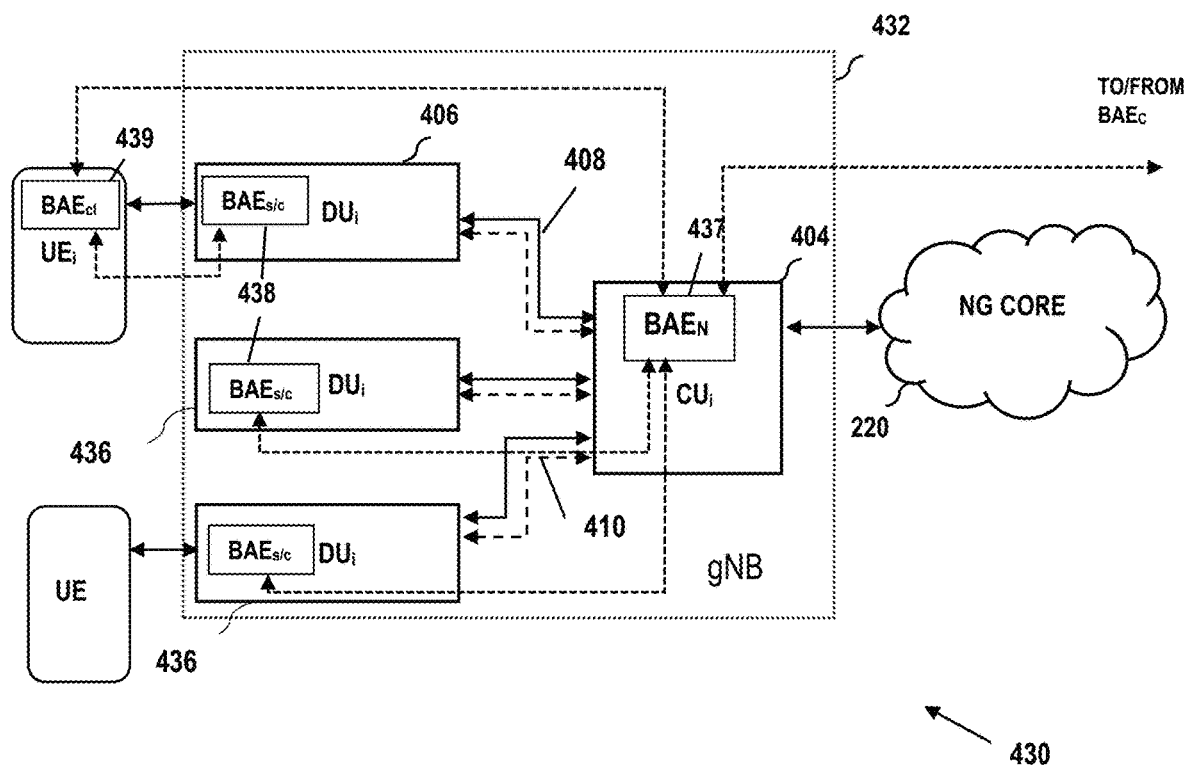
FIG. 4d is a functional block diagram of a fourth exemplary embodiment of a gNB architecture according to the present disclosure, including "intelligent" biometric-enabled CU (CUi) and DUis, as well as UEi.

In the architecture 430 of FIG. 4d, another exemplary configuration is shown, wherein the enhanced DUs (DUi's) 436 each have both a network portion or entity 437 ($BAE_n$) and a server/client portion or function 438 of the BAE within the gNB 422. Also, the target UE maintains a client or minion portion/function 439 of the BAE of its own in this configuration. The server client portion or function of the BAE ($BAE_{s/c}$) 438 is configured to act as both a server to the client 439, and a client to the $BAE_n$ 437, depending on role and desired function. As such, the client/minion 439 can be supported or serviced by the local server $BAE_{s/c}$ 438 autonomously of the $BAE_n$ and $BAE_c$ in one mode of operation. For instance, in one such case, the local mass storage 312 (FIG. 3) of the $BAE_{s/c}$ is sufficient to support necessary biometric profile persistence functions or other functions of the app(s) running on a given target UE. In the event that additional connectivity or data is required (e.g., the local mass storage of the serving $BAE_{s/c}$ does not contain sufficient data to service a request by the app(s), or the app(s) require a network slice or functionality that cannot be supported by the local $BAE_{s/c}$ and serving DU alone), the app(s) may, via the client/minion $BAE_{cl}$ of the UE, establish logical connection with the $BAE_n$ 437 of the cognizant gNB 432 to support the "broader reach" needed by the apps for both data (i.e., to the $BDB_L$) and network slicing/functions (via the broader NG core access and access to the network or centralized $BAE_c$). As such, the $BAE_{s/c}$ 438 can "switch roles" as needed, including supporting both roles simultaneously for the same or different UE within the RAN; e.g., by (i) acting as a server for one process or app running on a target UE, and a client to the $BAE_n$ for another process/app on the same UE, or (ii) acting as a server for one process/app on a first target UE, and acting as a client for another process/app running on a different UE served by the same DU. Similarly, as shown in FIG. 4d, each DUi 436 can service both $BAE_{cl}$-equipped and "COTS" or non-enhanced UE, as previously described.

Figure 4E:
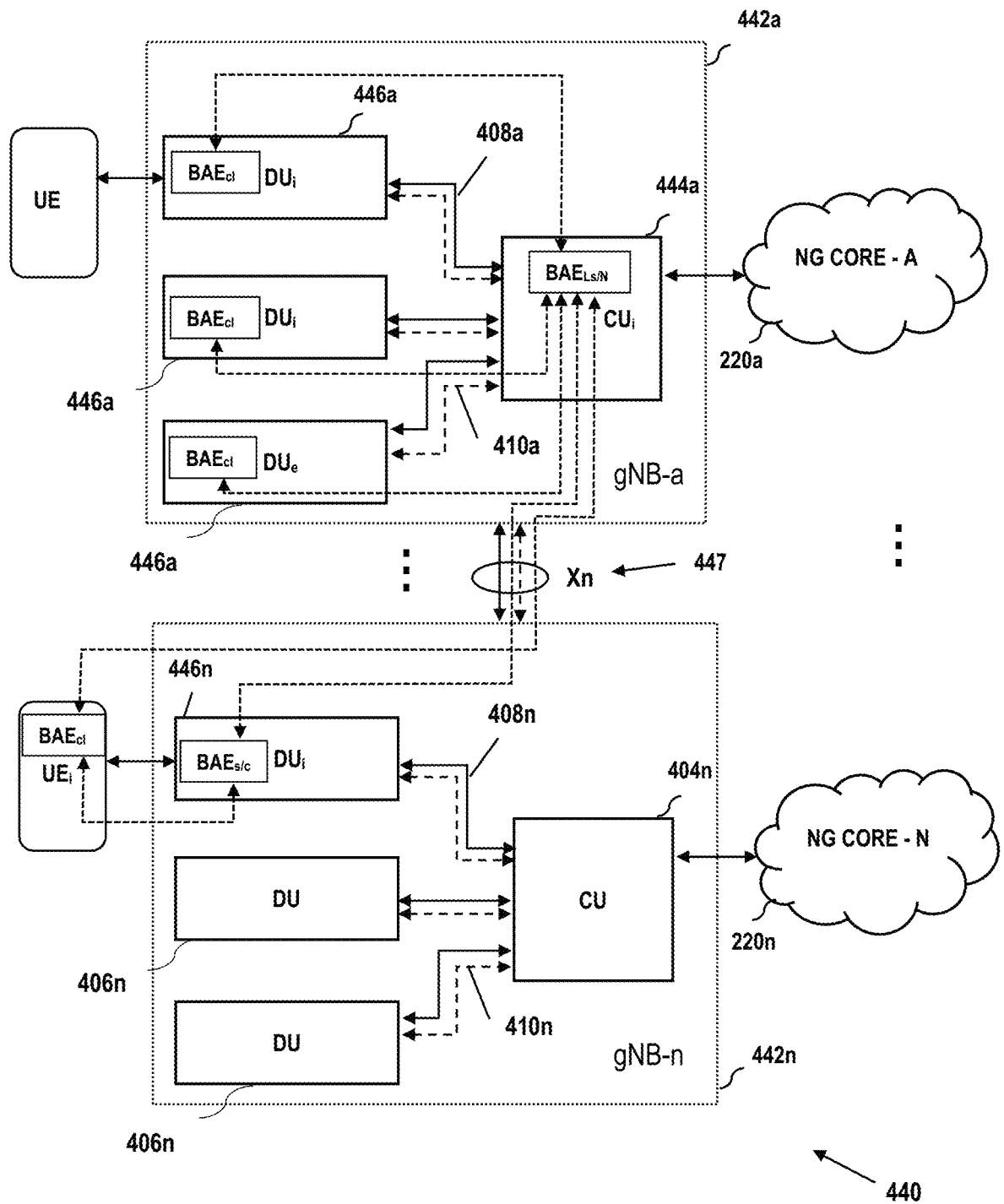
FIG. 4e is a functional block diagram of a fifth exemplary embodiment of a gNB architecture according to the present disclosure, including multiple "cross-connected" gNBs with "intelligent" components.

In the architecture 440 of FIG. 4e, two or more gNBs 422a-n are communicative with one another via e.g., an Xn interface 447, and accordingly can conduct at least: (i) CUi to CU data transfer and communication; (ii) CUi to CUi data transfer and communication (where so equipped), and (iii) intra DUi-CUi data transfer and communication. Separate NG Cores 220a-n are used for control and user plane (and other) functions of the network. As shown, a heterogeneous mix of UE types (i.e., those with and without client BAE processes), DU/DUi, and CU/CUi are possible, including cases where one CUi 444a controls the activity of DU/DUi in another gNB as shown, including support of BAE network, server and client functions for biometric data profile functions.

Figure 4F:
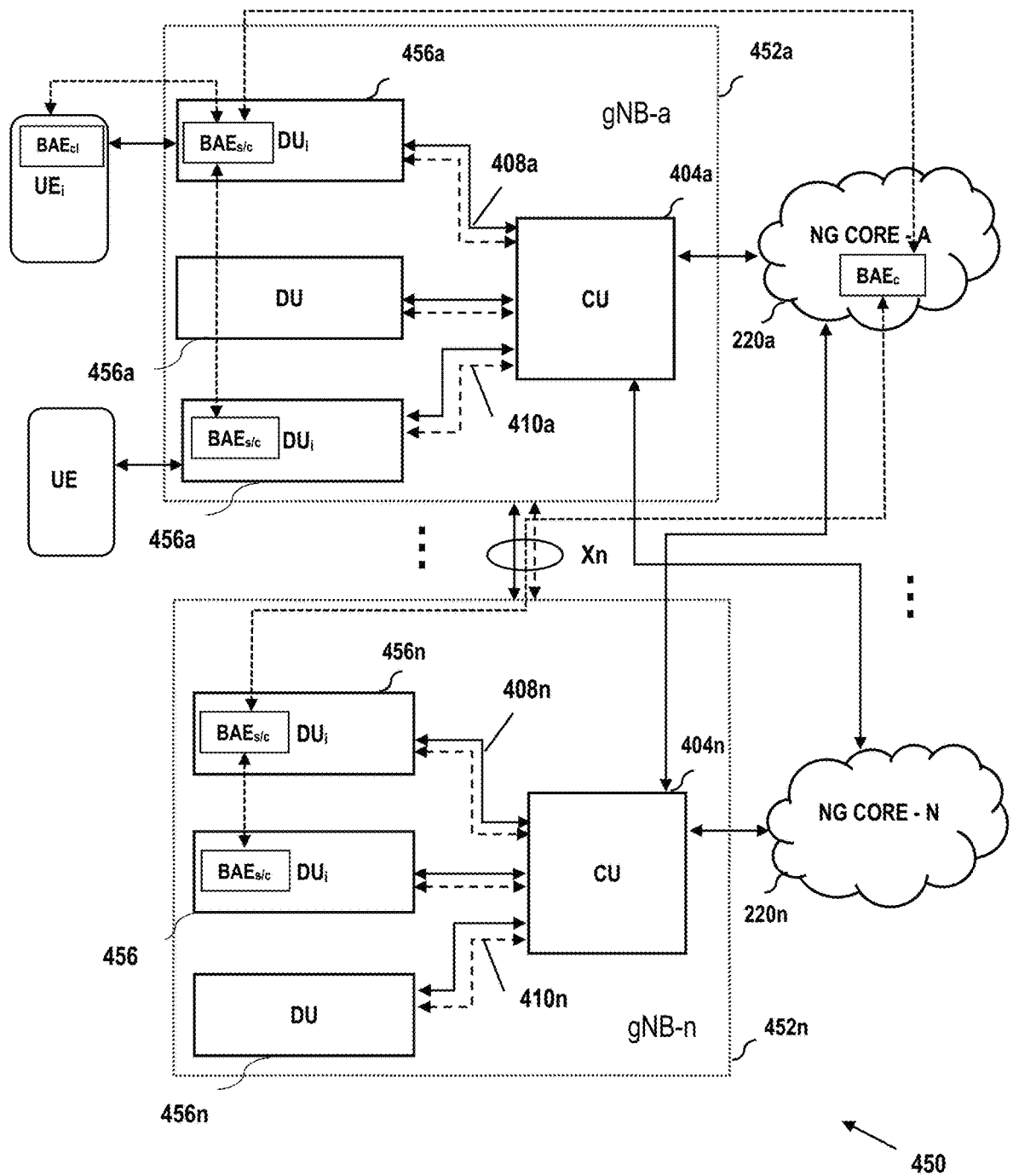
FIG. 4f is a functional block diagram of a sixth exemplary embodiment of a gNB architecture according to the present disclosure, including multiple "cross-connected" gNBs with DUi and network core-based control.

In the architecture 450 of FIG. 4fc, two or more gNBs 402a-n are communicative with one another via e.g., the Xn interface, and a BAEc 208 is utilized in conjunction with only $BAE_{s/c}$ (on one or more DUi's 456) and $BAE_c$ (on one or more client devices such as UEs). No CUi entities are present in this architecture. This approach has the advantage of, inter alia, allowing biometric data profile persistence and other functions to be supported only at via core and edge devices (i.e., the central BAEc, such as would be maintained by an MVNO or even a third party operator or service provider in an "OTT" fashion, and the end DU deployers (which may be e.g., enterprises, campuses, or even individuals in their homes).

Note also that in the architecture of FIG. 4f, the local BAE entities (i.e., the $BAE_{s/c}$ in each DUi of each gNB) act as servers/clients (depending on function) to (i) one or more other $BAE_{s/c}$, as well as (ii) the centralized BAE (i.e., BAEc), and (iii) $BAE_{cl}$ (e.g., UEs). For example, as shown, one $BAE_{s/c}$ 456a in FIG. 4f acts as each of (i)-(iii); i.e., a server to the $BAE_{cl}$ and the other $BAE_{s/c}$ within that gNB 452a, and a client to the $BAE_c$ in the NG core 220. The intra DUi function (i) allows for, inter alia, two or more DUi within a gNB to coordinate biometric data support and slicing functions, including in cases where the UE is mobile and moving from the first DUi to the second, or UE associated with each respective DUi are communicating or engaging in biometric-related activity such as a common VR/AR session.

Moreover, the separate NG Cores 220a-n of FIG. 4f are logically "cross-connected" to the gNBs of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 402 other than its own, and so forth), or the gNBs 402 and NG Cores 403 may form a "mesh" topology where multiple Cores 220 are in communication with multiple gNBs or multiple different entities (e.g., service providers). This cross-connection approach advantageously allows for, inter alia, sharing of biometric function/profile infrastructure between two MNOs/MVNOs, which is especially useful in e.g., dense deployment environments which may not be able to support multiple sets of "intelligent" RAN infrastructure of the type described herein.

Yet other topologies will be recognized by those of ordinary skill given the present disclosure.

Moreover, while described primarily with respect to a unitary gNB-CU entity or device as shown in FIGS. 4a-4e, the present disclosure is in no way limited to such architectures. For example, a distributed or dis-aggregated or distributed CU/CUi entity (e.g., one wherein the user plane and control plane functions of the CU/CUi are dis-aggregated or distributed across two or more entities such as a CUi-C (control) and CUi-U (user)) may be used, and/or other functional divisions employed.

Yet further, heterogeneous architectures of eNBs or femtocells (i.e., E-UTRAN LTE/LTE-A Node B's or base stations) and gNBs may be utilized consistent with the architectures of FIGS. 4a-4f. As one example, a given DUi may act (i) as a DUi (i.e., 5G NR PHY node) and operate outside of an E-UTRAN macrocell, or (ii) be physically colocated with an eNB or femtocell and provide NR coverage within a portion of the eNB macrocell coverage area, or (iii) be physically non-colocated with the eNB or femtocell, but still provide NR coverage within the macrocell coverage area.

It will also be appreciated that dynamic switching of BAE processes and their functions may be conducted consistent with the present disclosure, whether in isolation or conjunction with CU/DU split changes. Specifically, in one embodiment, the roles and/or "anchor points" for BAE process calculations and control may change as a function of, without limitation: (i) user/UE mobility; (ii) invocation/teardown of applications requiring biometric data persistence; and (iii) the presence or absence of BAE-enabled UE (UEi) and/or DUi. See e.g., FIG. 4d, wherein a UEi (top of FIG. 4d) is in a client/server relationship with $BAE_{s/c}$ of serving DUi with the $BAE_{s/c}$ acting in the server role, but such $BAE_{s/c}$ switches to client role for to the BAEN for a non-enabled UE (bottom of FIG. 4d).

See, as another example, the scenario depicted in FIG. 4*f* herein; as shown, gNB-a 452*a* includes two DUi 456*a* with $BAE_{s/c}$ processes. When a UEi is served (e.g., RRC Connected status achieved) by one of those two DUi, that DUi may automatically assume the "server" role with respect to the other DUi (and its $BAE_{s/c}$), and establish connectivity as needed with the $BAE_c$ 210 in the core (discussed further below) on behalf of the gNB globally. If/when the UEi moves and associates with say the second DUi in that gNB, the second DUi may then assume the server role and functions, with the first DUi/$BAE_{s/c}$ relegated to client status.

As another example, consider the case where all participating UE/UEi for a given persistence scenario are entirely served (initially) within a gNB; see FIG. 4*e* as one example. In such cases, the $BAE_{Ls/N}$ may act as the $BAE_c$, in effect freeing the BAEc in the core from such participation except as required (e.g., for accesses to the central BDBc). However, when that same UE moves to another area covered by a second gNB (bottom of FIG. 4*e*), the $BAE_{Ls/N}$ of the first gNB will assume "proxy" BAEc functionality for the serving DUi in the second gNB as shown, via the Xn interface 447. The $BAE_{Ls/N}$ in the first gNB may also relinquish its role as "proxy" $BAE_c$ thereafter when, for instance the second gNB or associated UE requires functions only supported by the $BAE_c$ in the core.

As yet another example, consider the architecture 430 of FIG. 4*d*, wherein the UEi and its $BAE_{cl}$ 439 are initially in a client/server relationship with the $BAE_{s/c}$ 438. In the even that a situation arises in servicing the biometric-based apps on the UEi (e.g., a functionality is requested that is not supported by the $BAE_{s/c}$ 438), then the BAEcl 439 can switch roles to act as a client of the BAEN of the CUi, or even the $BAE_c$ in the core (not shown).

Numerous other dynamic role switch scenarios will be recognized by those of ordinary skill in the art given this disclosure, the aforesaid examples being merely illustrative.

Distributed gNB Splits

In the 5G NR model, the DU(s) 406 (including the inventive "intelligent" DUi's described herein) comprise logical nodes that each may include varying subsets of the gNB functions, depending on the functional split option. DU/DUi operation is controlled by the CU/CUi (and ultimately for some functions by the NG Core 220). Split options between the DU/DUi and CU/CUi (depending on configuration as shown in FIGS. 4*a*-4*f*) in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CU/CUi 404 while PDCP (packet data convergence protocol), RLC (radio link control), MAC, physical layer (PHY) and RF are kept in the DU/DUi, thereby maintaining the entire user plane in the DU/DUi.

Under Option 2 (PDCP/RLC split), there are two possible variants: (i) RRC, PDCP maintained in the CU/CUi, while RLC, MAC, physical layer and RF are in the DU/DUi(s) 406; and (ii) RRC, PDCP in the CU/CUi (with split user plane and control plane stacks), and RLC, MAC, physical layer and RF in the DU/DUi's 406; in addition, the RRC and PDCP for the control plane stack and the PDCP for the user plane stack can be split into different central entities.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CU/CUi 404, while MAC, physical layer, and RF are maintained in the DU/DUi's.

Under Option 5 (Intra-MAC split), RF, physical layer and lower part of the MAC layer (Low-MAC) are in the Du/DUi's 406, while the higher part of the MAC layer (High-MAC), RLC and PDCP are in the CU/CUi 404.

In the High-MAC sublayer under Option 5, the centralized scheduling is tasked with the control of multiple Low-MAC sublayers, including high-level centralized scheduling decisions. The inter-cell interference coordination in the High-MAC sublayer is tasked with interference coordination methods such as JP/CS CoMP.

Conversely, in the Option 5 Low-MAC sublayer, time-critical functions include the functions with demanding delay requirements (e.g. HARQ), or the functions where performance is proportional to latency (e.g. radio channel and signal measurements from PHY, random access control). Delay requirements associated with the fronthaul interface are reduced. Radio-specific functions in the Low-MAC sublayer can perform scheduling-related information processing and reporting, and may also measure/estimate the activities on the configured operations or one or more served UE's statistics (including reporting periodically or in response to requests issued by the High-MAC sublayer).

Under Option 6 (MAC-PHY split), the MAC and upper layers are in the CU/CUi, while the PHY layer and RF are in the DU/DUi's 406. The interface between the CU/CUi and DU/DUi's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DU/DUi's 406, while remaining functions reside in the CU/CUi 404. In the DL, iFFT and CP addition may reside in the DU/DUi 406, while the remainder of the PHY resides in the CU/CUi 404.

Under (sub)Option 7-1, in the UL, FFT, CP removal and PRACH filtering functions reside in the DU/DUi, the remainder of PHY functions reside in the CU/CUi. In the DL, iFFT and CP addition functions reside in the DU/DUi, the remainder of PHY functions reside in the CU/CUi.

Under (sub)Option 7-2, the UL, FFT, CP removal, resource de-mapping and pre-filtering functions reside in the DU/DUi, the rest of PHY functions reside in the CU/CUi. In the DL, iFFT, CP addition, resource mapping and precoding functions reside in the DU/DUi, the remainder of PHY functions reside in the CU/CUi.

Option 7-3 (DL only), only the encoder resides in the CU/CUi, and the remainder of PHY functions reside in the DU/DUi.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, load balancing, and mobility.

The so-called RU or Radio Unit as used in this context refers to the analog domain RF front-end unit (i.e., A/D and D/A conversion and antenna components, as well as beamforming).

The foregoing split options are intended by 3GPP to enable flexible hardware implementations which allow scalable cost-effective solutions, as well as coordination for e.g., performance features, load management, and real-time performance optimization. Moreover, configurable functional splits enable dynamic adaptation to various use cases and operational scenarios, including those relating to the persistent/distributed biometric profile support functions described herein. Factors considered in determining how/when to implement such options can include: (i) QoS requirements for offered services (e.g. low latency, high data throughput); (ii) support of requirements for user density and load demand per given geographical area (which may affect RAN coordination); (iii) availability of transport and backhaul networks with different performance levels; (iv) application type (e.g. real-time or non-real time); and (v) feature requirements at the Radio Network level (e.g. Carrier Aggregation).

It will further be appreciated that the 5G architecture includes CP/DP split options; i.e., allocation of CP and UP functionalities across, e.g., different entities. Network functions are categorized as belonging to the CP or UP, and standardized interface may be implemented for interactions between the two. As one advantage, decoupling of these planes allows for greater flexibility, and obviated replacement of the UP in instances where the CP is modified.

Accordingly, in one embodiment of the present disclosure, an "intelligent" CU/DU (i.e., CUi and DUi) architecture is provided wherein the functional splits described above (and in fact others being possible) are dynamically varied or determined based on applications and/or use cases being invoked by one or more users within a given portion of the NG RAN architecture. Particularly, in one implementation, applications or use cases involving biometric data for determination of user context or maintenance of user state across domains trigger determination by the CUi (e.g., $BAE_{Ls}$ or $BAE_N$ or $BAE_{s/c}$ thereof) or another process of an optimized split or division of functions within the local portion of the RAN, and cause configuration of components (e.g., one or more DU/DUi therein). These splits may also be on a per application basis, including according to network slices as described elsewhere herein.

Figure 5A:
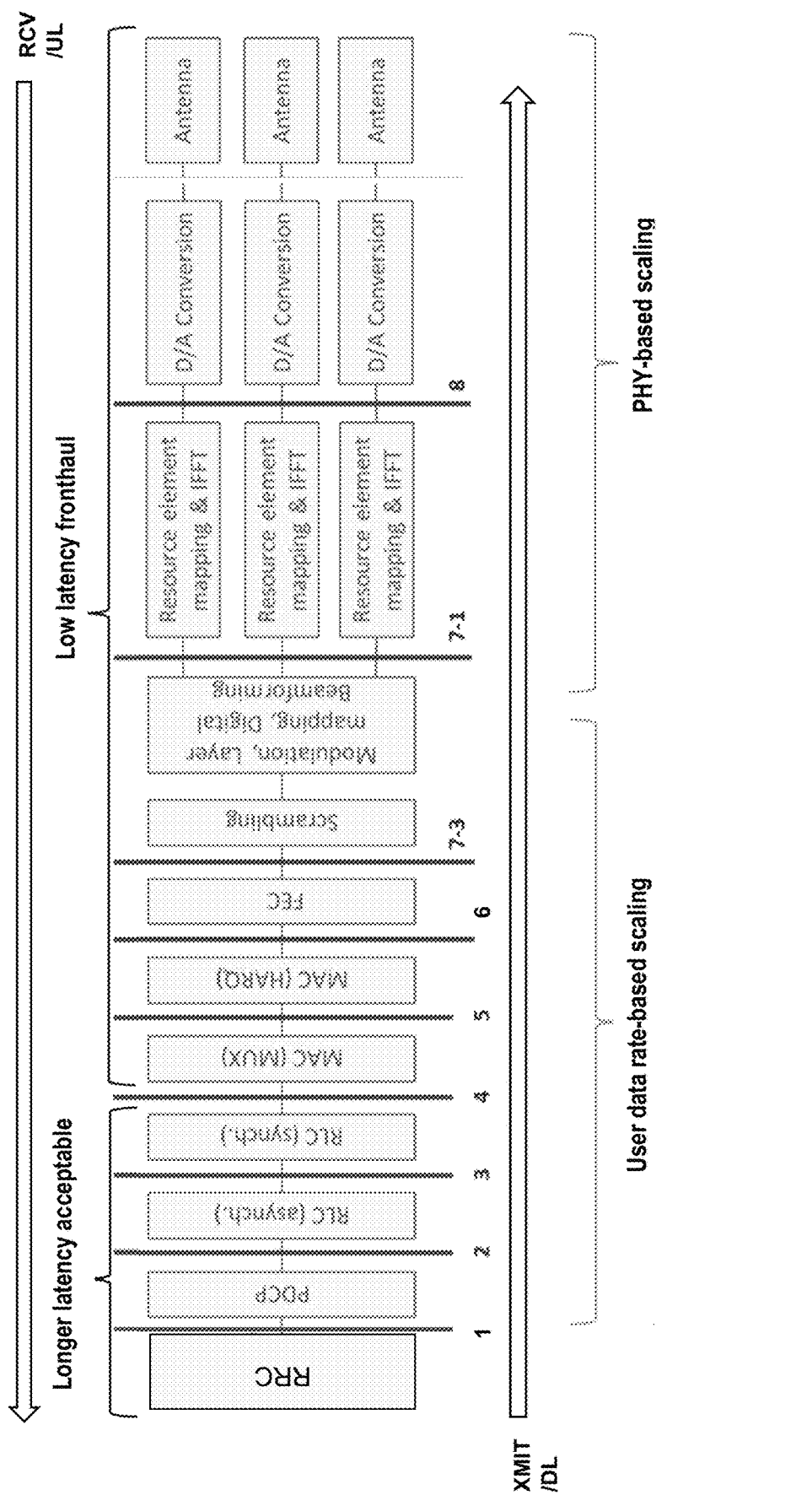
FIG. 5a is a block diagram illustrating prior art 5G gNB CU/DU split options.
Figure 5B:
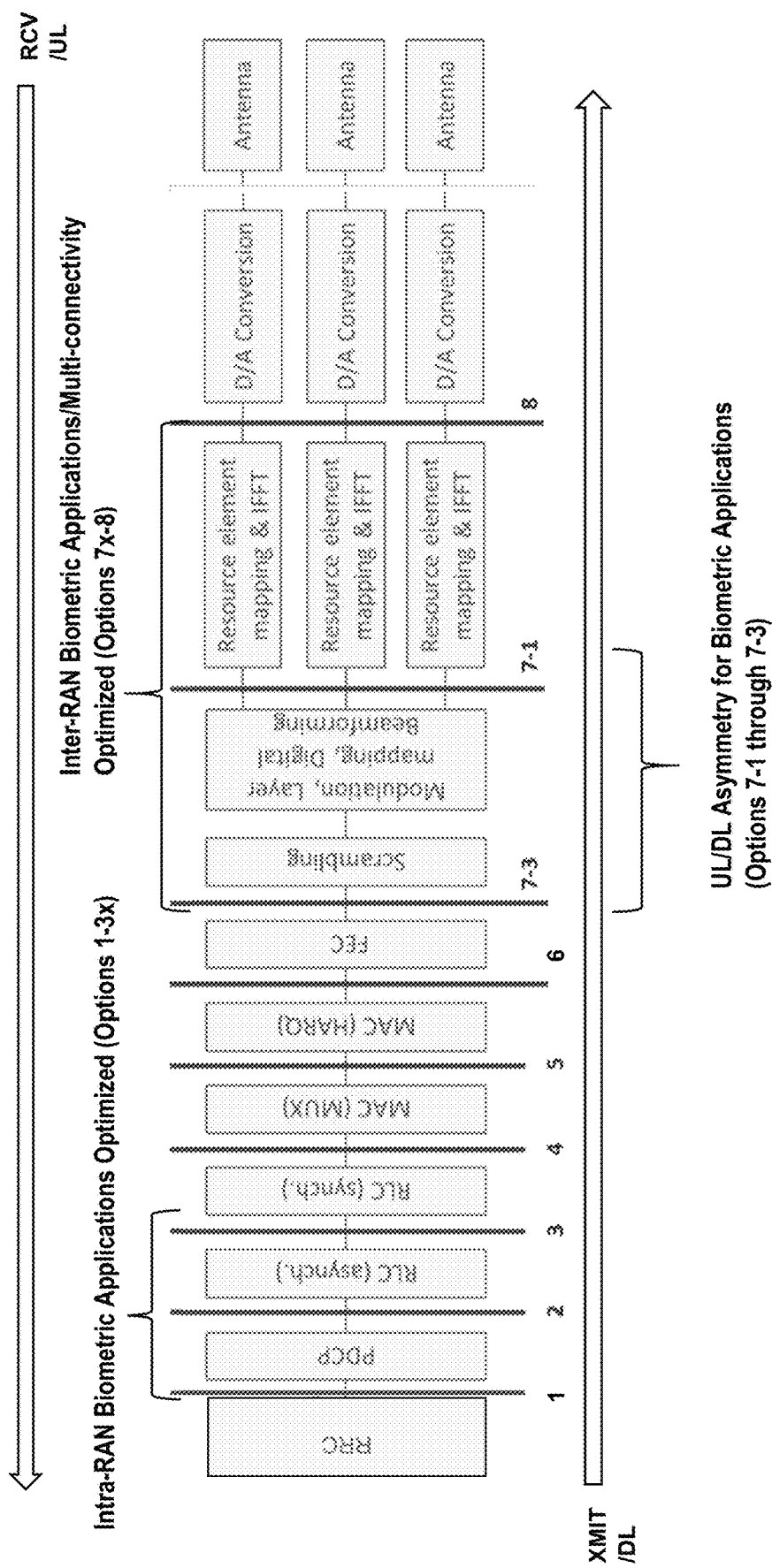
FIG. 5b is a block diagram illustrating exemplary 5G gNB CU/DU split options in support of biometric profiling/persistence according to the present disclosure.
Figure 6A:
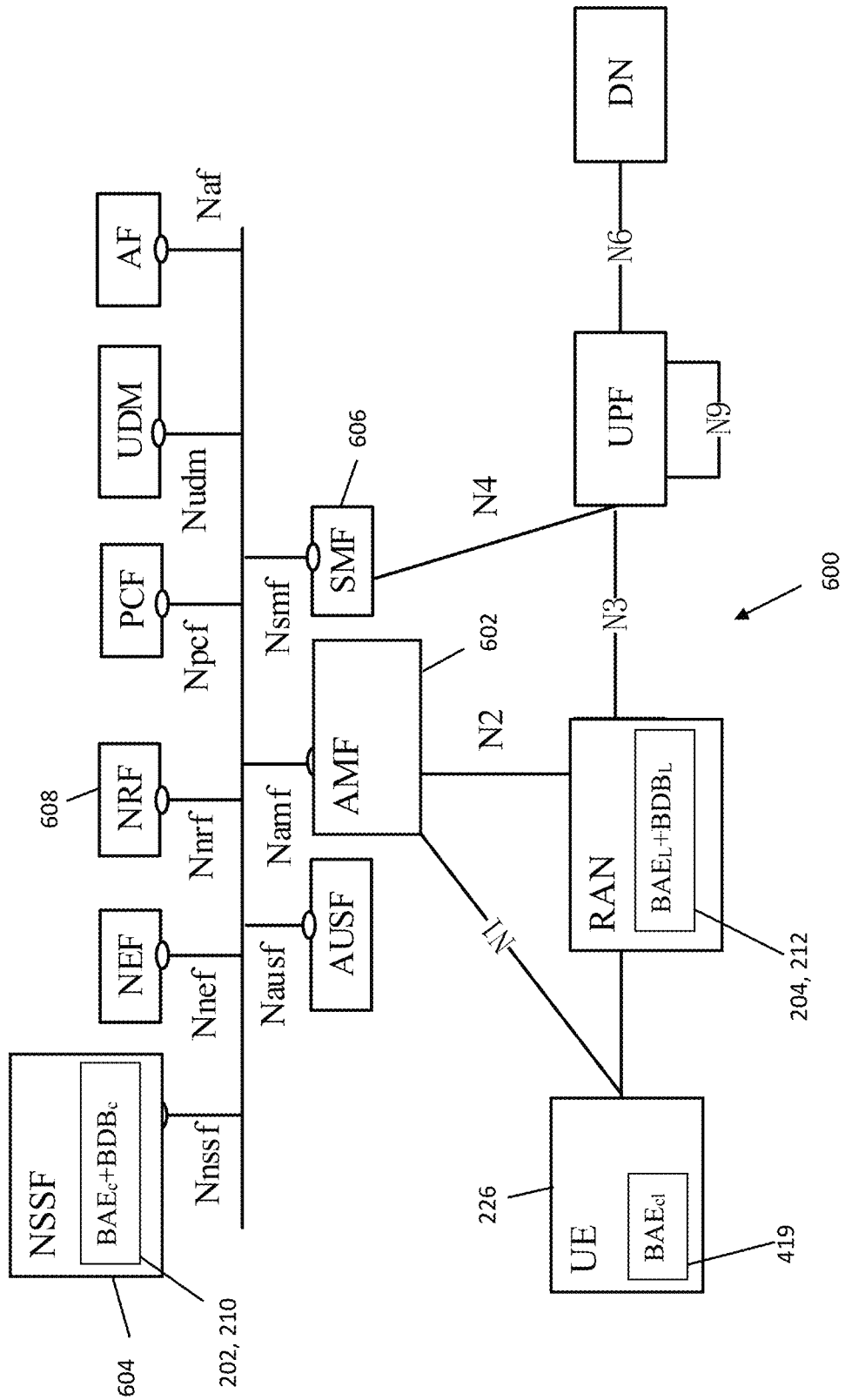
FIGS. 6a-6d are block diagrams illustrating exemplary embodiments of 5G NR-based wireless network architectures including the biometric data functionality of FIG. 2.
Figure 6B:
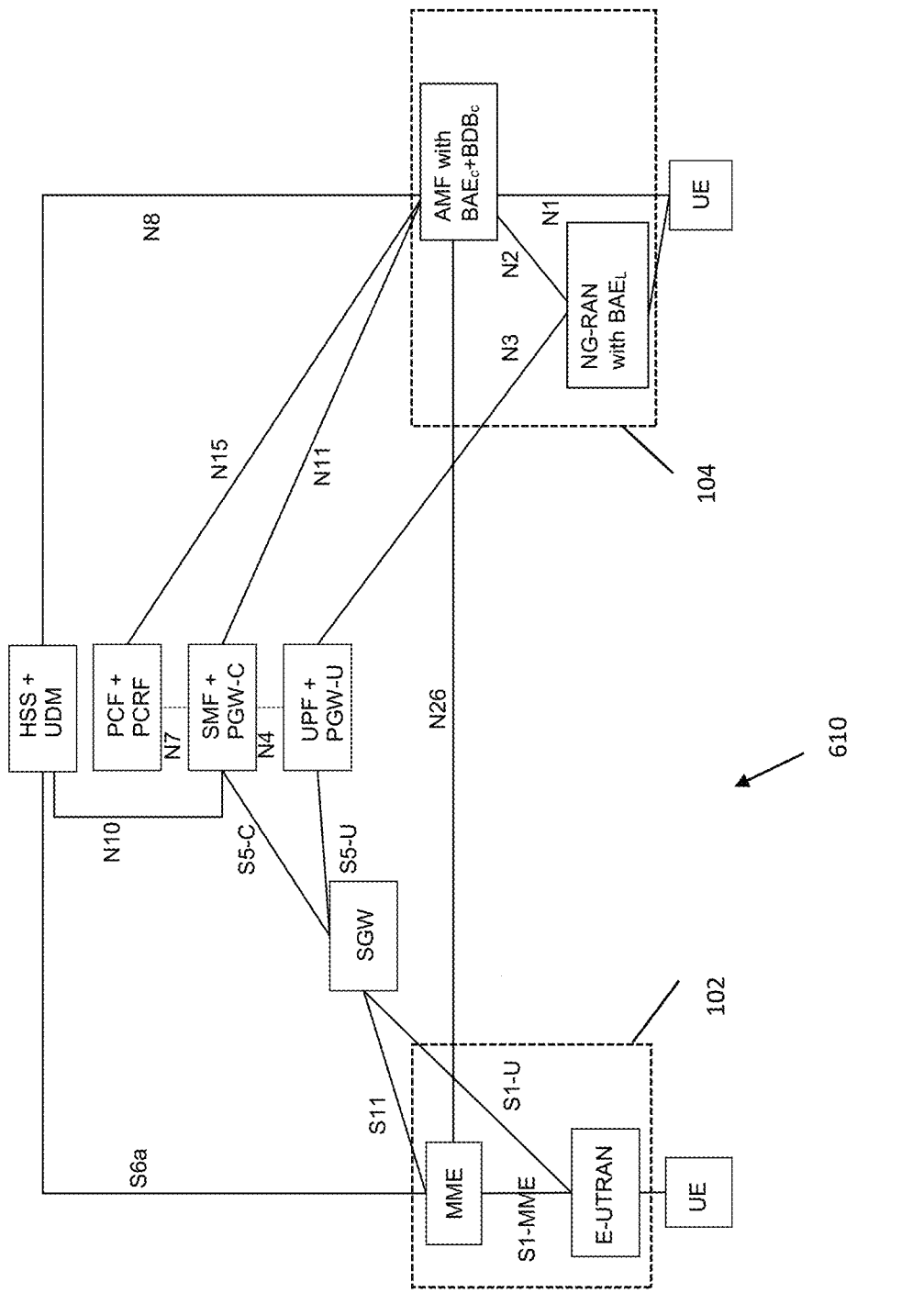
Figure 6C:
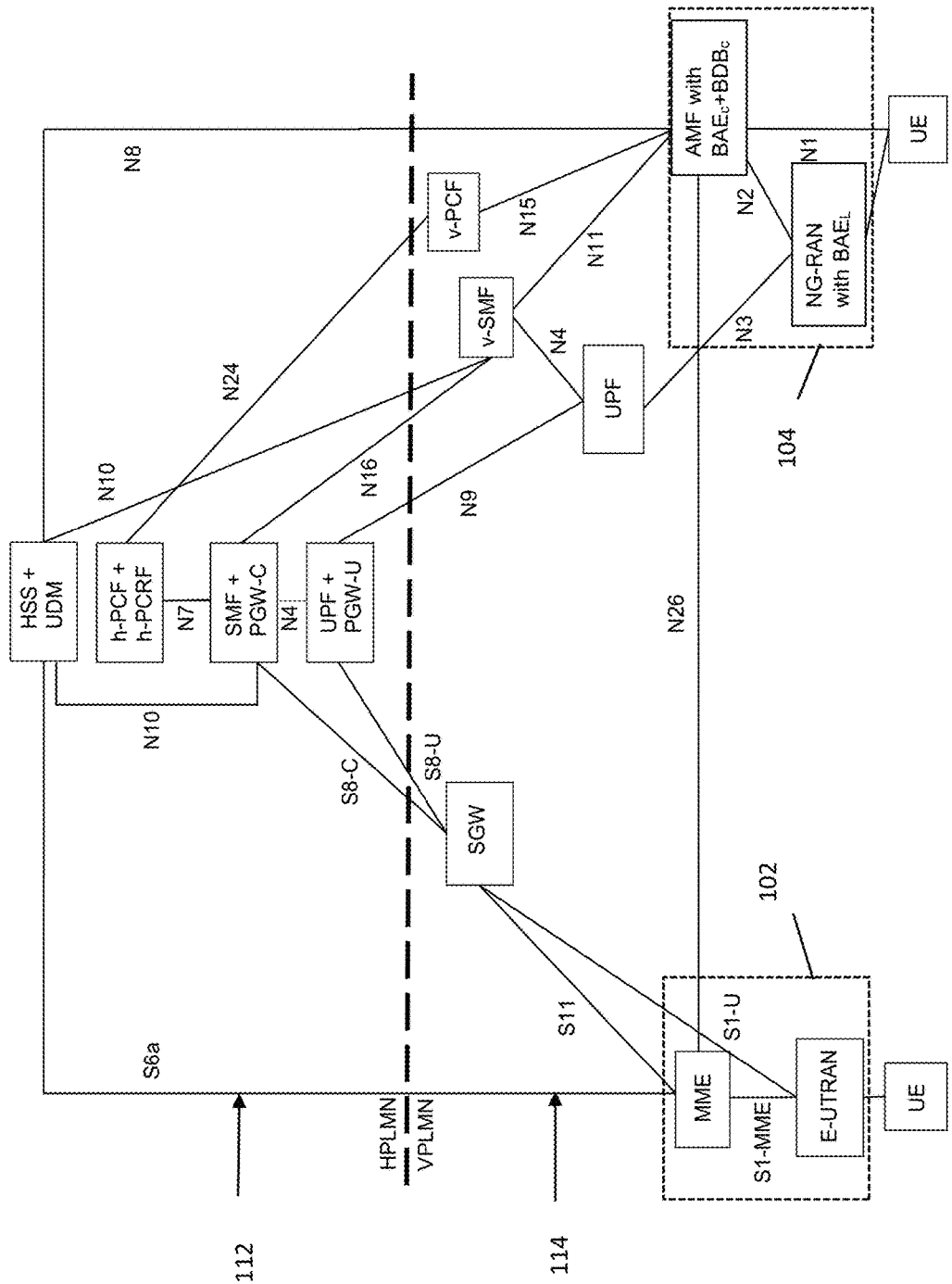
Figure 6D:
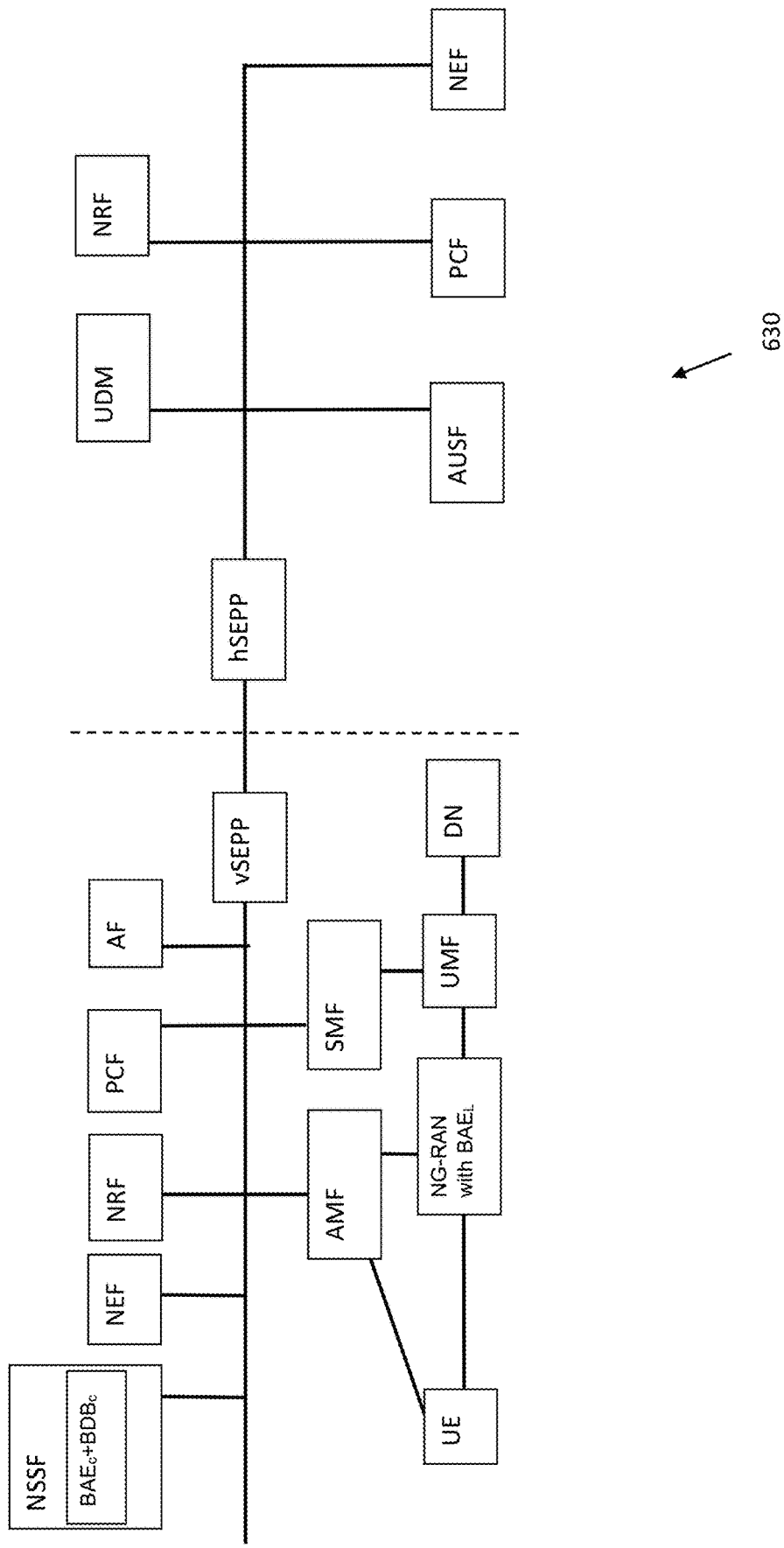

As noted above, under Option 1, the entire user plane may be maintained in the DU/DU(i). Hence, according to one embodiment of the present disclosure, the relevant biometric application engine ($BAE_x$) determines that the extant user application for a given target UE can be serviced using local (e.g., intra-DU/DUi or intra-gNB) assets, and accordingly causes configuration of the gNB according to Options 1-3 (see FIG. 5c), thereby in effect pushing as much functionality out to the edge of the network, and reducing backhaul requirements by conducting scheduling and other related decisions within the DU/DUi(s) of the RAN.

On the DU/DUi side, massive MIMO and beam tracking/switching require high precision time estimates in support of e.g., mobility, which militates in favor of a more distributed architecture; i.e., more functionality within the DU(s)/lower number splits, thereby trading increased latency (due to e.g., scheduling decisions lacking coordination by the CU) for the above-mentioned precision and distributed functional support.

Alternatively, more centralized functionality in the CU may be a better fit, such as in cases where overlapping cells with multiple connectivity to the device and network (another unique feature of 5G architectures). Small and Macro cells combining to provide given services to a UE is one scenario where such multiple connectivity is utilized. As such, access network selection functions, or others which require a more global perspective, are best centralized for such reasons (e.g., higher number splits).

Layer coordination is a function of split number; e.g., Layer 1 coordination requires a high number split (e.g., Option 8, where only the RU/RF functionality is distributed). Coordination only at Layer 3, conversely, allows the split number to be lower.

Under the higher number split options, a high bandwidth DU-to-CU connection or backhaul is needed (e.g., CPRI), whereas under the lower number split options, the backhaul bandwidth can be lower.

Based on the foregoing, the dynamic reallocation of splits within a given RAN or MNO/MVNO network also allows dynamic use of more or less capable backhauls between the CU and DU(s); i.e., as the split number shifts down, less capable backhauls can be substituted (e.g., via multiplexing).

It is also noted that realtime (RT) and non-realtime (NRT) functions may be identified as part of the option selection criteria. RT functions tend to be (lower) MAC and below, while NRT functions tend to reside at (higher) MAC and above. As such, biometric persistence profile functions can generally be grouped into these two categories, and the functional split selected accordingly; i.e., with NRT functions in the CUi/$BAE_{Ls}$, and RT functions in the DUi.

Biometric-related applications can generally be classified according to different levels of required latency (e.g., those having critical functions such as relating to safety or which inherently require real-time or near real-time support can be classified as RT, while others such as facial recognition may be acceptable under the NRT classification). As such, the system (FIG. 2) may be architected such that the full range of biometric application categories can be supported (including with BAE processes both within local data centers/gNBs and more centrally located, such as within the core 220, as shown in the variants of FIGS. 4a-4f herein. Moreover, the CU/CUi and DU/DUi split options provide a complementary framework under which the various categories or use cases for the biometric related applications can be optimized for; i.e., both selection of proper BAE process and CU/DU split options can be utilized to optimize a given application.

As a brief aside, a number of different identifiers are used in the NG-RAN architecture, including those of UE's and for other network entities. Specifically:

the AMF Identifier (AMF ID) is used to identify an AMF (Access and Mobility Management Function, described above);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to e.g., the MNO/MVNO or its customers, various portions of the foregoing can be associated and stored to particular gNB "clients" (e.g., UEs) or their components being backhauled to the network core, as described in greater detail elsewhere herein.

Context Module

Referring again to FIG. 3, also included within the BAE 210, 212 is a context module 308. In the exemplary embodiment, this module 308 includes algorithms which determine a given user/UE context in support of biometric persistence functions as described herein. Context, as used in the present discussion, broadly includes the "situation" a given user/UE finds themselves/itself in at any given point in, or period of, time. For instance, a user context may include aspects such as (i) activity (e.g., at work, at leisure, asleep, driving, meditating, taking a shower), (ii) geographic location (e.g., at the building where they work, at their home, in transit, at the mall, etc.), (iii) interpersonal (e.g., in a face-to-face conversation/interaction, in a telephone conversation, in a video chat conversation, in a VR or AR conversation/interaction, in a conflict (in any of the foregoing), romantically engaged, (iv) non-interpersonal (e.g., those irrespective of other people, such as being in a natural disaster, in a traffic jam on the freeway, eating lunch or dinner alone), and (v) domain (e.g., real world or RW, augmented reality or AR/ARW, and virtual reality (VR)), the foregoing being merely exemplary. These aspects obviously may overlap with one another, and can be characterized in different fashions. More broadly, however, they provide a framework by which context of a given UE or user within the system can be specified, as described in greater detail herein.

Realities/Domains—

According to one embodiment of the present disclosure, at least four domains or "realities" may be defined for use with the persistent biometric data profile(s); (i) reality or RW (defined as a user's actual real-world experiential context at a given point in time); (ii) augmented reality or AR/ARW (i.e., similar to (i), but with one or more augmentations or enhancements with regard to sensory attributes or user-perceivable data); (iii) virtual reality or VR (i.e., a completely artificial rendition or generation of one or more aspects of the user's sensory perceptions; and (iv) temporal-shifted reality TSR (e.g., future reality), such as a temporal projection of the user's sensory experiences at a future time given a prescribed set of inputs.

One notable subset of the aforementioned augmented reality (AR/ARW) domain is complementary or "third person" reality; i.e., an augmentation of a user's reality with data of another user, device or process perceiving the same "reality." In effect the user's sensory perceptions are augmented with data from two or more other people, processes, etc. experiencing the same "reality" but from different spatial or other perspectives (such as where a user viewing a sporting event also receives data relating to viewing of the same event contemporaneously from a different portion of the sporting venue).

Advantageously, the persistent biometric data of the present disclosure allows for, inter alia, transfer of data relating to human characteristics or attributes across two or more heterogeneous ones of the foregoing reality domains.

As but one example, a person in reality (category (i) above), could utilize persistent biometrics or attributes in virtual or augmented reality domains, such that their "persona" (or at least selected portions thereof) are transferred and maintained in the alternate reality domain.

Gesture control of devices is known in the art. For example, IR or other sensors may be used as inputs to algorithms configured to determine placement and orientation of a person's hand, or motion thereof in a particular direction, speed, etc. Likewise, a sequence or series of movements can be used to trigger certain functions as opposed to others (i.e., to provide differentiation between various inputs).

"Security aspects for biometric activity (e.g., special hand waves) to authenticate a user.

BDB Module

Referring again to FIG. 3, also included within the BAE 210, 212 is a BDB module 310. In the exemplary embodiment, this BDB module 310 includes algorithms which determine in effect, based on output from the context, CU/DU split, and BA modules as applicable, where/when/what to reposition or distribute biometric profile and other related data in support of the persistent biometric profile functionality described herein. As discussed with respect to FIG. 2, the different BDBs (central/local) may be heterogeneous in data constituency, including instances where the individual $BDB_L$'s 204 contain data most relevant to actual or predicted applications/usage by certain UE's and/or users. For example, a given gNB may service one or more known or commonly connecting UE's (e.g., residents of an area serviced by one or more DU of the gNB), and the UE device profile(s) and biometric support profile of the UE (and associated user) is known. In one implementation, the UE is characterized in terms of (i) 5G-NR related capabilities, including support for 5G functions such as network slicing, as well as any biometric-related apps or functions resident on the UE. As an example of the latter, the UE may include an AR application which utilizes the camera, BLE, accelerometer, facial recognition software, fingerprint scanner/app, etc. of the UE (e.g., smartphone or tablet) to support the AR functions of that app. The profile or configuration of that UE as such is known to the BAEc 210, and accordingly the BAEc causes the BDBL local to the serving gnB to populate with data supporting those functions (as well as configuring CU/DU splits, etc. as described elsewhere herein).

Such purposely positioned or populated data may include for instance (a) data relating to other UE/users within a prescribed set or relationship of the target UE/user (e.g., those previously communicated with, or capable of communication with, via the AR/VR or other biometric applications resident on the target UE, designated users in a "contacts" or "game partners" list, other family members under a common MNO/MNVO subscription plan, etc.), (b) data relating to geographically proximate UE, places, etc. (i.e., UE/users/places which the target UE/user may encounter in their travels within the gNB coverage area(s)) which bear one or more aspects of tangency to the target UE/user's persistent profile, such as the Japanese restaurants described elsewhere herein which relate to the user's "Japanese" biometric persona, (c) supporting or background data relating to the UE/people/places of (b), such as in-depth profiles, imagery, audio, etc. of those places/people.

Also included within the BDB module 310 of the exemplary BAE 210, 212 is a manifest generation engine or process (not shown), which is used to generate and maintain the manifests 215 (see discussion of FIG. 2) that are maintained by that particular BAE, as well as others within the architecture. In one particular implementation, these manifests are each dynamically updated and shared with other nodes (including up to all other nodes in the system or designated portion of the system) on a routine/periodic or event-driven basis so as to maintain each of the participating nodes (and their associated BAE) cognizant of the data/structure. In one variant, each node/BAE within a prescribed system or portion thereof maintains manifests for all others, with the one or more centralized BAEc 210 also maintaining the manifests (as well as all of the underlying data associated with the persistent profiles of multiple UE/users).

Surreptitious corruption of the contents of any BDB or portion thereof, or the BDB system as a whole, can be frustrated through use of cryptographic techniques such as distributed ledger maintenance/processing such as e.g., "blockchain." As a brief aside, the virtual domain contains no physical conservation laws. In the physical world, a token of value (e.g., a physical coin) cannot be "double spent." Specifically, Alice cannot give a coin to Bob, and then give the same coin to Charlie because of conservation of matter. In contrast, there is nothing that prevents Alice from sending the same digital token to both Bob and Charlie. Proof-of-work (POW) is a virtualized representation of physical entropy (e.g., computational work, memory searches, etc.). A blockchain is a data structure that records accumulated POW; in modern use, blockchains accumulate POW at rates that introduce physical conservation laws into the virtual domain. More directly, a blockchain represents the accumulation of entropy on scales that are physically impractical for malicious parties to attack. For example, cryptocurrencies use a blockchain that is continuously checked by a network of miners to ensure that only valid transactions are added within blocks to the blockchain. Although a malicious party may attempt to generate a false POW, it is physically infeasible to generate a valid POW for the ever expanding blockchain (due to practical constraints on processing power and/or memory). Invalid POW transactions can be identified and rejected by the community of miners in the network. Additionally, in some cases the node or IP address associated with a misbehaving miner or malicious party can experience undesirable consequences; for example, a miner that generates excessive amounts of invalid POW may be banned from the network, waste resources, fined, and/or penalized.

More generally, artisans of ordinary skill in the related arts will appreciate that cryptocurrencies (like Ethereum) that are based on a community of untrusted parties which cooperate to share a public ledger must implement barriers to malicious activity and/or penalize malicious behaviors. The combined results of infeasibility of attack, expense to attack, and the likelihood of penalty for a failed attack provide strong disincentive for malicious behavior within cryptocurrency networks; in this manner, cryptocurrency networks are able to ensure that the shared ledger can be trusted, without vesting trust in any single party.

In extant and future applications, biometric data such as that described herein and used to, inter alia, support the persistent biometric profile functions of the disclosure will be collected by many parties of unknown provenance with purely tangential contact to a user (e.g., IoT devices, POS devices, other user devices, etc.). The ability for any untrusted parties to modify a ledger of user data, in a manner that is openly scrutinized and that cannot be maliciously altered, is an ideal application for blockchains. More directly, the properties of blockchains enable the sharing of a ledger (e.g., manifest 215) of data across many different parties of (potentially) unknown origin, such as gNBs of unknown or known users or MNOs/MVNOs, and can be a fundamental building block for ephemeral biometric data collection applications.

Accordingly, in some exemplary implementations of the architecture 200 of FIG. 2, the manifests 215 can be "integrity protected" using blockchain or similar mechanisms against surreptitious corruption or manipulation. Notably, in a highly dynamic environment contemplated in some use cases for the present disclosure (e.g., mobile users, invocation of multiple biometric-supported applications, etc.), the manifests and their underlying data may be modified, supplanted, distributed, etc. in a highly dynamic manner as well, including frequent updates and "moves" of or changes in data. As such, there is a built-in temporal component, i.e., the manifests and some of the underlying data are varying rapidly, thereby making surreptitious modification difficult.

Accordingly, in one embodiment, the BDB module(s) are configured to implement blockchain-based processing and POW rules to assure the integrity of the manifests and underlying data.

Referring again to FIG. 3, also included within the BAE 210, 212 is a local mass storage device(s) 312 used for, inter alia, caching data from the associated BDB 202, 204 locally to the O/S so as to reduce latency for accesses. In one variant, the data selected for storage in the cache is predicated upon analysis by the BAE (including based on the output of the BA, CU/DU split, and context modules) as to the most "preferable" data for caching. Latency is an important consideration, but other factors may also be considered in the determination of most preferable, including for instance (i) the likelihood or probability that the given data will be accessed within a prescribed period of time (which can be based on e.g., whether a given VR, AR, or other application type potentially requiring the e.g., biometric data is invoked by a served UE, (ii) the servicing requirements (or lack thereof) with the type/volume of data (e.g., larger data volumes may be more likely to be cached in some cases since their transmission bandwidth and processing time may be longer), including any QoS or other requirements, and/or (iii) the constituency of the UE population served by the BAE/CU/DU of interest; for example, whether designated target UE are local, within one or more prescribed user/device subsets (such as those belonging to a prescribed geographic or demographic group, etc.).

Network Slice Module

Referring again to FIG. 3, another logical module included within the BAE entity 210, 212 is the Network Slice Module (NSM) 312. In 5G NR, a network "slice" can be viewed as a logical end-to-end network that can be dynamically created/torn down, and which provides specific network capabilities and network characteristics. A network slice is defined within a Public Land Mobile Network (PLMN), and includes the CP and UP functions of the core as well as the 5G Access Network (AN); possible 5G ANs include (i) NG Radio Access Network (RANs) such as those described in 3GPP TS 38.300, and (ii) A non-3GPP Access Network where the user device may use a non-3GPP access to reach the 5G core network (e.g., via a secured IPSec/IKE tunnel terminated on a Non-3GPP InterWorking Function (N3IWF)).

Notably, any given 3GPP User Equipment (UE) may access one or more slices over the same Access Network (e.g. over the same radio/air interface or RAN). Each slice may serve a particular application or service type, including enforcement of Service-level Agreement (SLA) requirements such as QoS if desired. See TS 23.501. TS 23.501 defines Network Function, Slice, and Slice Instance as follows:

Network Function: 3GPP adopted or 3GPP defined processing function in a network, which has defined functional behavior and 3GPP defined interfaces. A network function can be implemented as any of 1) a network element on dedicated hardware, 2) as a software instance running on dedicated hardware, or 3) as a virtualized function instantiated on an appropriate platform, such as for example on a cloud infrastructure element.

Network Slice: A logical network that provides specific network capabilities and network characteristics.

Network Slice instance: A set of Network Function instances and the required resources (e.g. compute, storage and networking resources) which form a given Network Slice.

Identification of a Network Slice is accomplished via the aforementioned S-NSSAI. The NSSAI (Network Slice Selection Assistance Information) is a collection of individual S-NSSAIs. S-NSSAI generally includes: (i) a Slice/Service type (SST), which describes the expected Network Slice features and services; and (ii) a Slice Differentiator (SD), comprising optional data that expands on or complements the SST(s) to differentiate multiple Network Slices of the same SST value. The S-NSSAI is signaled by the UE to the network, and enables the network to select a particular Network Slice instance.

S-NSSAI values may be associated with a PLMN (e.g., a given PLMN ID), and can also include either/both network-specific values and/or standardized or default values. An S-NSSAI can for example be used by a particular UE within an access network of the PLMN with which the S-NSSAI is associated.

3GPP allows at present up to eight (8) S-NSSAIs in the NSSAI sent in signaling messages between the UE and the network. As such, a given UE may be served by eight different Network Slices at a time.

A number of standardized SST values have been defined to date in 3GPP TS 23.501. These SST values (Table 1 below) ostensibly reflect commonly used Slice/Service Types, and aid in interoperability for slicing.

lates network slice subnet-related requirements from network slice-related requirements.
3. Network Slice Subnet Management Function (NSSMF): This function is responsible for management and coordination of NSSI.

Accordingly, in one variant of the present disclosure, a new SST slice types relating to persistent biometric profile creation, maintenance and use is added, which includes a plurality of SST slice sub-types for further refinement of particular operations/use cases (see discussion of use cases infra).

Network Architectures—

FIGS. 6a-6d illustrate various embodiments of network architectures useful in supporting the persistent biometric profile function (and other biometric related functions) of the present disclosure, including for HPLMN and VPLMN operating cases, as well as "local breakout" scenarios.

Figure 7:
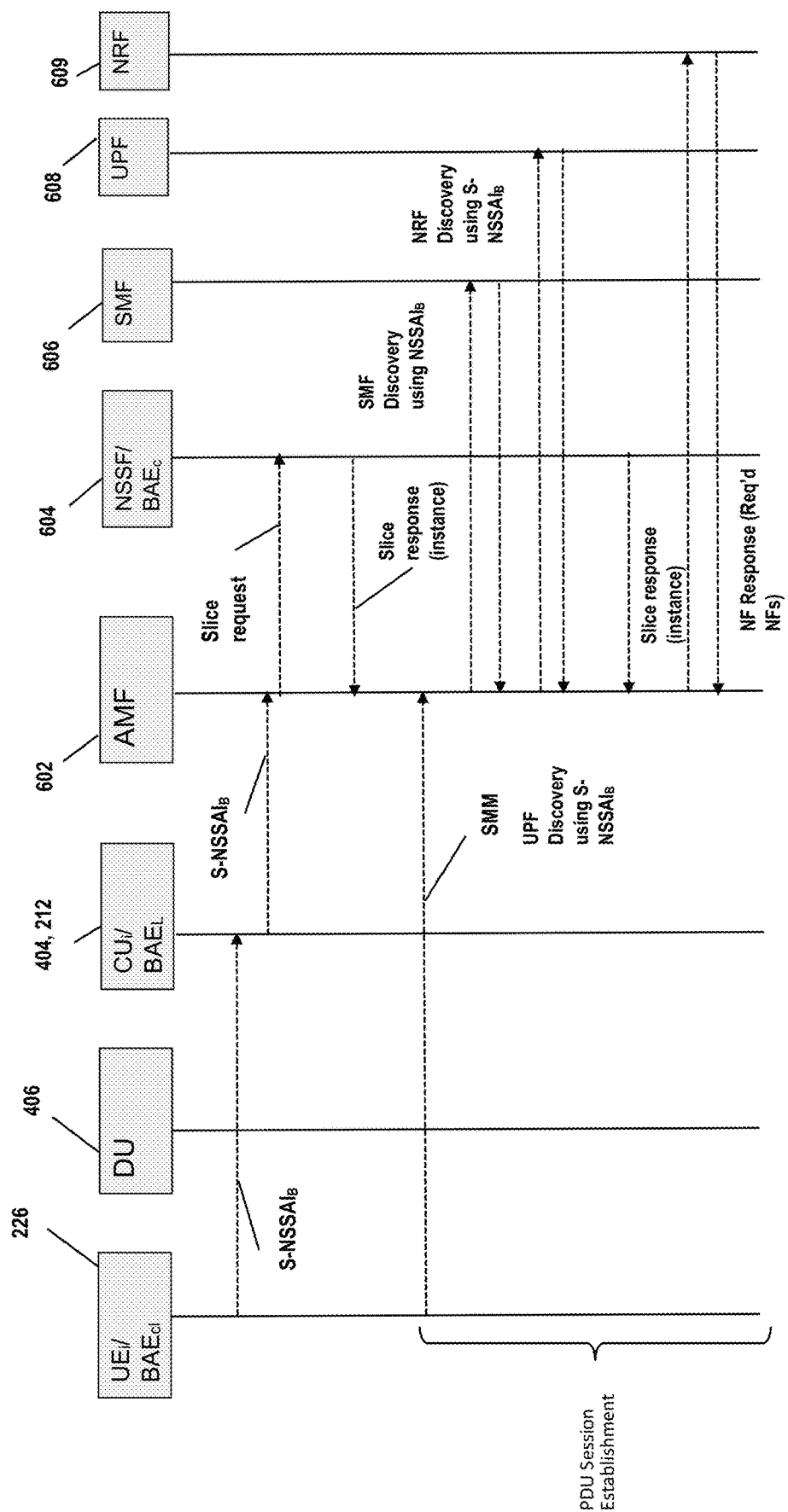
FIG. 7 is a ladder diagram illustrating an exemplary embodiment of a message exchange between the various entities within the biometric-enabled architecture described herein in support of network slice establishment for biometric profile/persistence support.

FIG. 7 is a ladder diagram illustrating an exemplary embodiment of a message exchange between the various entities within the biometric-enabled architecture described herein in support of network slice establishment for biometric profile/persistence support.

DUi Apparatus—

Figure 8:
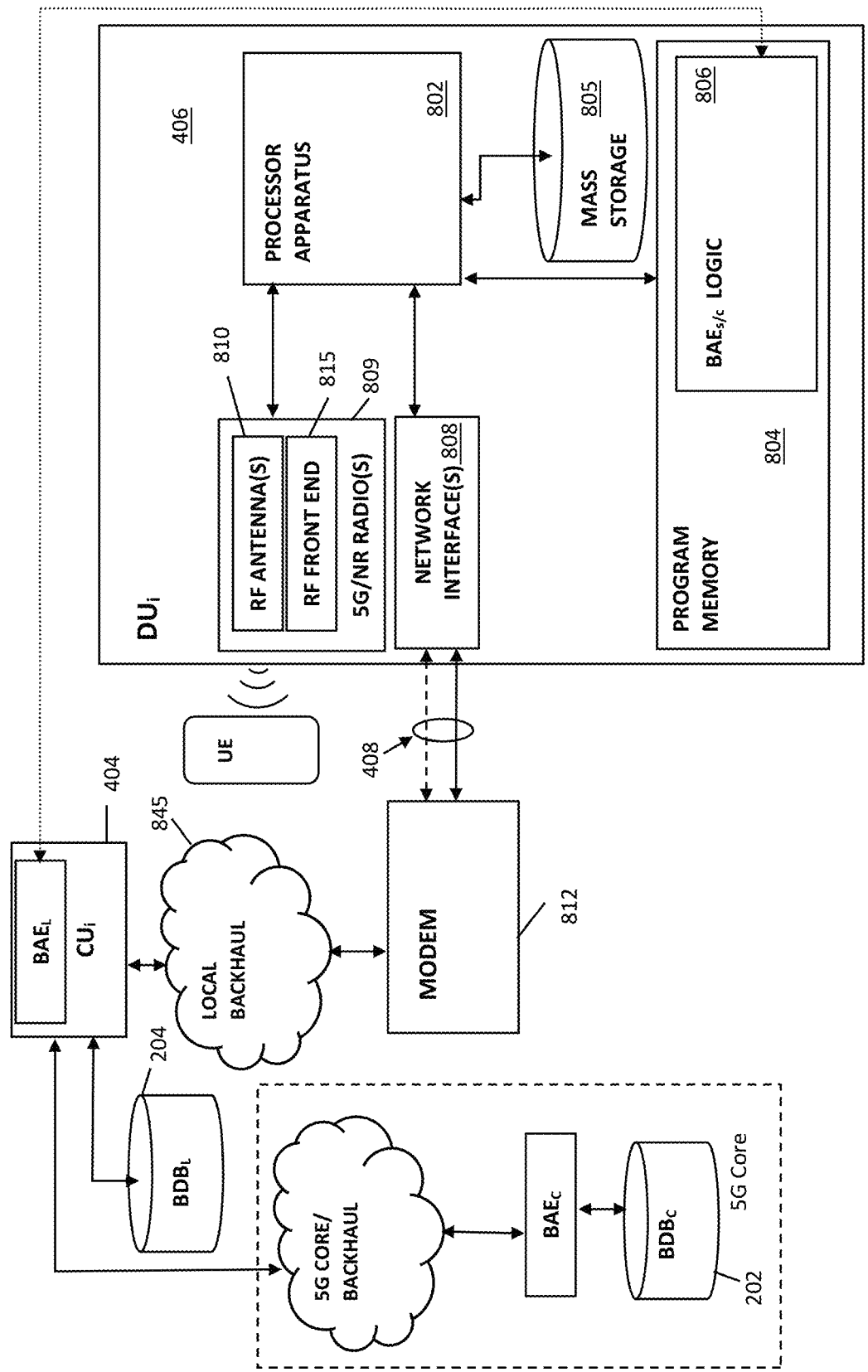
FIG. 8 is a block diagram of one embodiment of an intelligent 5G DU (DUi) of a gNB according to the present disclosure.

FIG. 8 illustrates an exemplary DUi access node 406 according to the present disclosure. As shown, the DUi 406 includes, inter alia, a processor apparatus or subsystem 802, a program memory module 804, mass storage 805, a $BAE_{S/C}$ logic module 806, one or more network (e.g., to CU, backhaul and LAN) interfaces 808, as well as one or more radio frequency (RF) devices 809 having, inter alia, antenna (e) 810 and one or more RF tuners 815.

At a high level, the exemplary DUi of FIG. 8 maintains in effect at least two "stacks"; (i) a 3GPP-compliant 4/4.5G stack for communication with prior legacy (e.g., Release 13) UE and EPC/E-UTRAN entities; and (ii) a 3GPP-compliant 5G NR "stack" for DU communications with Release 15 and beyond 3GPP-compliant UEs and UEi's (mobile devices 226).

TABLE 1

SST values

| Slice/Service type | SST value | Characteristics |
| --- | --- | --- |
| eMBB (enhanced Mobile Broadband) | 1 | Slice suitable for the handling of 5G enhanced Mobile broadband, including streaming of High Quality Video, fast large file transfers, etc. eMBB supports stable connections with very high peak data rates, as well as moderate rates for cell-edge users. |
| URLLC (ultra- Reliable Low Latency Communications) | 2 | URLLC supports low-latency transmissions of small payloads with very high reliability from a limited set of terminals. |
| MIoT (Massive IoT)/mMTC (Massive Machine Type Communications) | 3 | MIoT/mMTC supports a massive number of Internet of Things (IoT) devices, which are only periodically active and send limited size data payloads. |

3GPP TR28.801 also introduces three management logical functions:

1. Communication Service Management Function (CSMF):—This function is responsible for translating the communication service-related requirements to network slice-related requirements.

2. Network Slice Management Function (NSMF): This function is responsible for management and orchestration of network slice information/instance, and trans- In the exemplary embodiment, the processor 802 may include one or more of a digital signal processor, microprocessor, field-programmable gate array, or plurality of processing components mounted on one or more substrates.

The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The RF antenna(s) 810 are configured to detect and transceive signals from radio access technologies (RATs) in the service area including or example, LTE (including, e.g., 5G, LTE, LTE-A, LTE-U, LTE-LAA) signals may be used as the basis of communication between the CUi and the various mobile devices (e.g., UEs/UEi's) being served. The antenna(s) 810 may include multiple spatially diverse individual elements in e.g., a MIMO- or MISO-type configuration, such that spatial diversity of the transceived signals can be utilized.

In the exemplary embodiment, the radio interface(s) comprise one or more 5G NR and LTE-based radios compliant with 3GPP. Moreover, the extant LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. Notably, NG-RAN also integrates with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The tuner 815 in one embodiment comprises a digitally controlled RF tuner capable of reception of signals via the RF front end (receive chain) of the 5G/LTE radio(s) 809 in the aforementioned bands, including in one variant simultaneous reception (e.g., both 2.300 to 2.500 and 5-6 GHz bands at the same time).

The processing apparatus 802 is configured to execute at least one computer program stored in memory 804 (e.g., a non-transitory computer readable storage medium); in the illustrated embodiment, such programs include logic to implement the biometric profile persistence, maintenance and update logic described previously herein. Other embodiments may implement such functionality within dedicated hardware, logic, and/or specialized co-processors (not shown).

In some embodiments, the BAE logic program 806 utilizes memory 804 or other storage 805 configured to temporarily hold a number of data reports or files before transmission via the backend interface(s) 810 to the CUi ($BAE_{s/n}$ or $BAE_N$) or the core ($BAE_c$). In other embodiments, application program interfaces (APIs) such as those included in an MNO/MVNO-provided application or those natively available on the DUi (e.g., as part of the computer program noted supra or associated with the BAE logic 806) may also reside in the internal cache or other memory 804. Such APIs may include common network protocols or programming languages configured to enable communication between the DUi and CUi, or other network entities in cases where the DUi BAE is directly communicative with the $BAE_c$, as well as use procedures for collecting, compressing and/or parsing information obtained via the antenna(s) 808 and radio 809. Data stored may relate for example to biometric-based applications executing on various UE/UEi, or cached portions of the $BDB_L$ or $BDB_C$.

CUi Apparatus—

Figure 9:
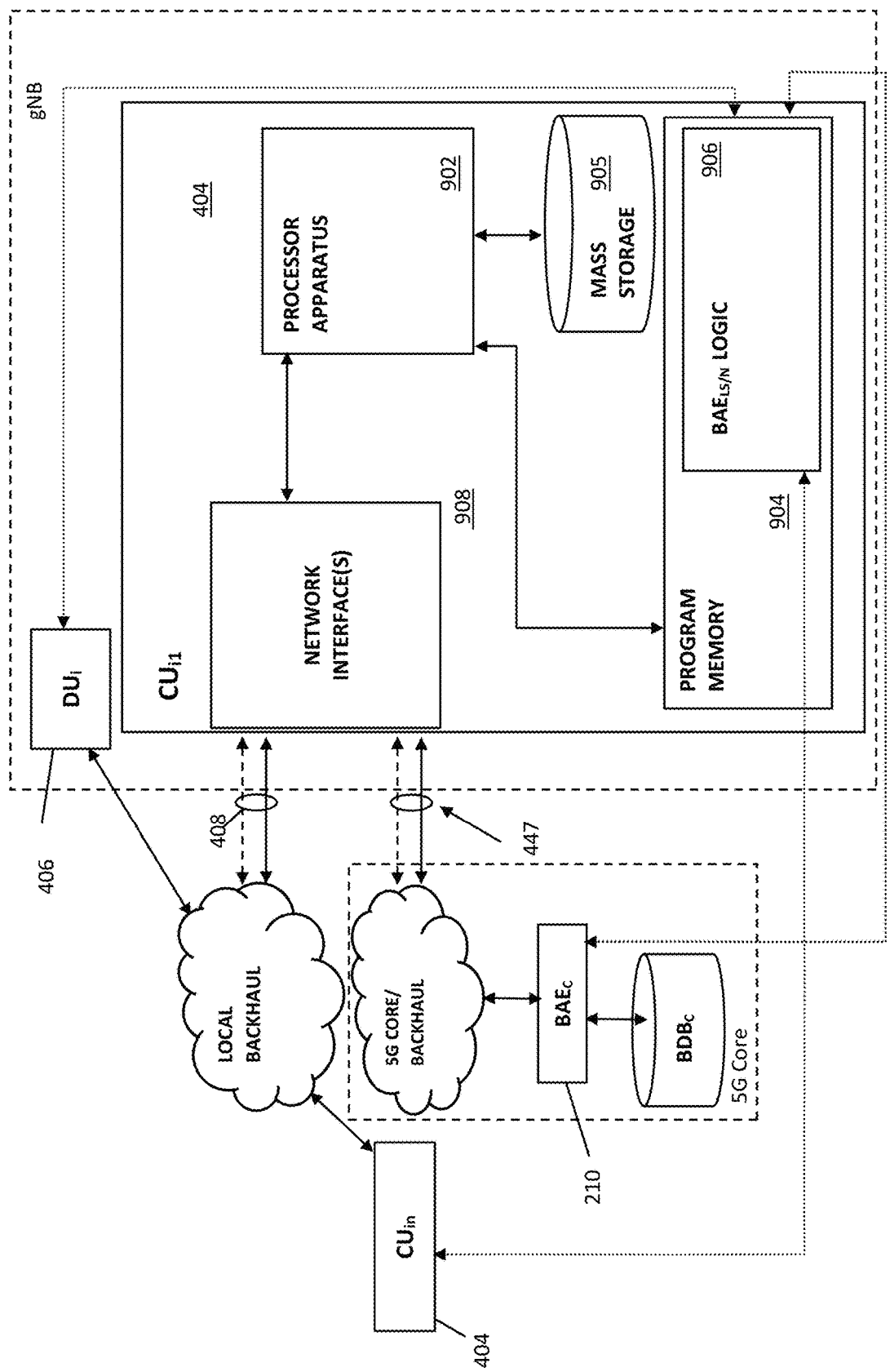
FIG. 9 is a block diagram of one embodiment of an intelligent 5G CU (CUi) of a gNB according to the present disclosure.

FIG. 9 illustrates an exemplary CUi apparatus 404 configured according to the present disclosure. As shown, the CUi 404 includes, inter alia, a processor apparatus or subsystem 902, a program memory module 904, mass storage 905, $BAE_{L/s/N}$ logic module 906, one or more network interfaces 908 for communication with e.g., the DU/DUi within the same gNB, other CUi/CU, and core network entities such as the $BAE_c$ (see FIG. 2).

The processor 902 is configured to execute at least one computer program stored in memory 904 (e.g., a non-transitory computer readable storage medium); in the illustrated embodiment, such programs include logic to implement the biometric profile persistence, data distribution, and access functions described previously herein. Other embodiments may implement such functionality within dedicated hardware, logic, and/or specialized co-processors (not shown).

In the exemplary embodiment, the processor 902 may include one or more of a digital signal processor, microprocessor, field-programmable gate array, or plurality of processing components mounted on one or more substrates. The processor 902 may also comprise an internal cache memory, and is in communication with a memory subsystem 904, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 902.

The BAEL/s/N logic is implemented in the exemplary embodiment to maintain data communication with the necessary entities for biometric function support, including any $BAE_c$, other $BAE_{L/s/N}$, $BAE_{cl}$.

Methods—

Referring now to FIGS. 10-14, embodiments of methods for implementing the various aspects of the present disclosure are described in detail.

Figure 10:
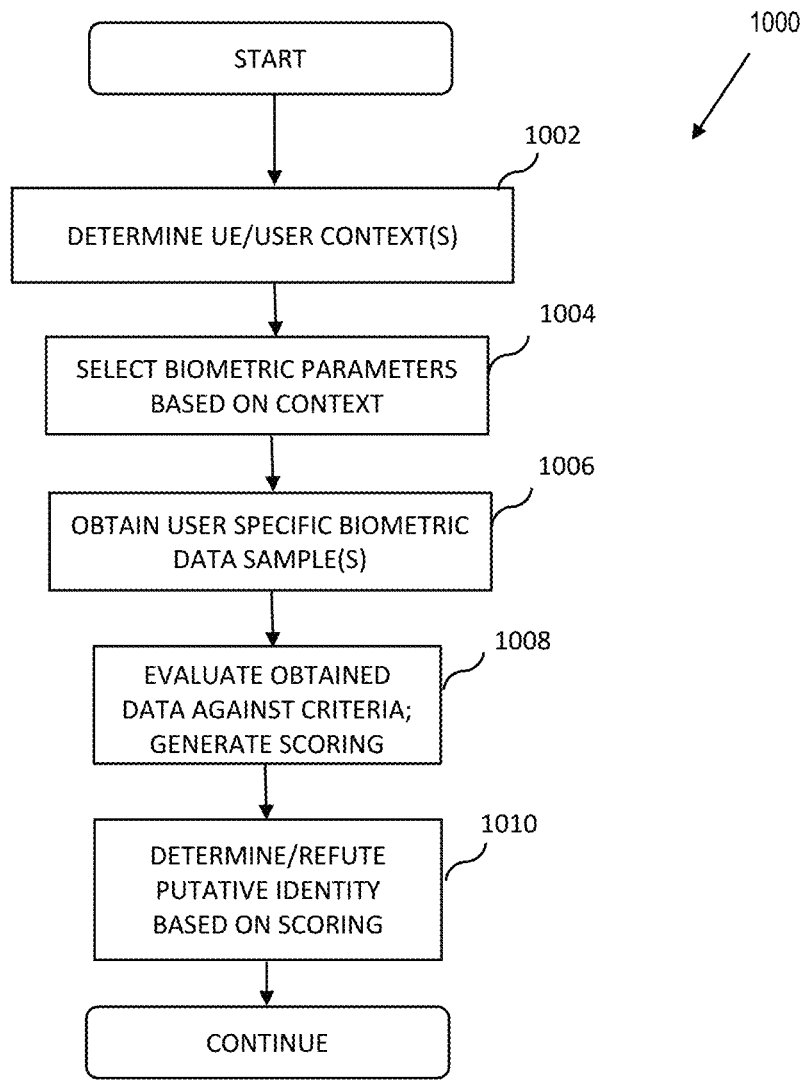
FIG. 10 is a logical flow diagram illustrating one embodiment of a method for identity determination/verification according to the present disclosure.

FIG. 10 shows one embodiment of a method 1000 of determining an identity of a user of a computerized mobile device (e.g., UE or UEi). The method includes first determining at least one context of the user per step 1002. In one variant, the determination of at least one context includes first obtaining a plurality of data relating to a user's actual or online activity, such as during a prescribed period of time. This may be from any number of sources including the UE/UEi itself, third party sources such as API calls made by the $BAE_x$, user input, user profiles, etc.

In one implementation, the prescribed time period comprises a window of time extending from a past time to a then-current time; e.g., within the past 5 mins., 6 hours, etc. This window may be dynamically varied based on e.g., the particular activity in question, historical data (e.g., does the user change context frequently), or other such factors.

Based at least in part on the aforementioned data relating to the user's actual or online activity, one of a plurality of preexisting context models is selected for further analysis. In one implementation, these context models comprise pre-structured data files or sets which are descriptive of various activities or states of the user and/or UE. These models form a basis for comparison with the obtained (e.g., contemporaneous) data of the user/UE so as to assign a score or probability that the user/UE is in the assessed state or context. For example, in one approach, the highest scoring template "match" or correlation is selected as the winning context model.

Next, per step 1004, based on the determined (selected) context (or contexts), a plurality of biometric parameters upon which to base the identity determination are selected. In one variant, the biometric parameters selected for identity determination under a given context may be according to a number of different schemes/factors, including e.g., accessibility, reliability, repeatability, etc. See e.g., Jain et al., *Biometrics: Personal Identification in Networked Society* discussed supra, which identified seven factors to be used when assessing biometric feature for use in e.g., biometric authentication, including:
  (i) universality (every entity under biometric analysis should possess a given trait);
  (ii) uniqueness (the trait should be sufficiently differentiable for different entities such that each can be uniquely identified);
  (iii) permanence (the degree to which that trait varies over time);
  (iv) measurability (the relative ease of data acquisition/processing or measurement of the trait);
  (v) technological performance (the accuracy, speed, and robustness of technology used to gather data about the trait and assess it);
  (vi) adoption (how well individuals in the relevant population of entities under analysis accept the technology and gathering of their personal data); and
  (vii) circumvention (the ease with which the trait might be imitated or subverted).

As noted, each given trait or parameter of an entity such as a person will be suited to different types of applications to varying degrees, and no single biometric parameter will generally be suitable for all possible applications. As such, each context (e.g., asleep, engaged in water sports, at work, eating, attempting a banking/financial transaction, etc.) will have a more optimal set of biometric parameters when considering one or more of the foregoing factors.

For example, in one implementation, it may be determined that a given person is engaged in a waterborne activity (e.g., swimming, waterskiing, sitting in a hot tub, etc.). As such, these activities can be modeled as having low reliability factors for fingerprint-based authentication, since any extended exposure to water by human fingers will result in so-called "pruning" which distorts the fingerprints somewhat. Hence, requests for authentication in such cases will be serviced using other, more putatively reliable metrics or parameters if/when available.

As another example, physiological or biometric attributes of a person may be different based on their ambulatory or other state at a given point in time. A pulse rate, cardiac rhythm, eye movement pattern, etc. may be markedly different when a person is asleep versus awake, or when anesthetized (e.g., in preparation for a medical procedure).

Likewise, ensembles or sets of parameters may be evaluated or dismissed based on context; in the foregoing example, a user may also be highly likely to be wearing eyewear (e.g., swim goggles, sunglasses) thereby making retinal or other eye-based features potentially of less utility or availability.

Another consideration in the selection of such parameters is availability, and hence in one implementation, the method 1000 includes first accessing configuration data for the computerized mobile device or UE/UEi, and based at least on the accessed configuration data, identifying a possible population of biometric parameters from which to select the plurality of biometric parameters for identity determination. For example, a middleware registry on the target device may indicate that the device includes (and biometric application/entity can access) a fingerprint scan app or API, accelerometer, GPS/A-GPS receiver, and reverse-facing CMOS camera and app for imaging of the user's face. Absence of the fingerprint scanning capability would militate in favor of not selecting that parameter for identity determination, since the user would need to be prompted to provide such data in another way/from another source.

Next, per step 1006, biometric data specific to the user and associated with the selected set of parameters is obtained, via available sources which may include the computerized mobile device, third party sources, APIs, user input, etc.

Next, per step 1008, the obtained biometric data relating to the selected plurality of biometric parameters is evaluated against e.g., one or more acceptance criteria relating to identification of the user. These criteria may be for instance a minimum score of the obtained data versus previously obtained or stored data for each of the parameters for which both obtained (current) and criterion (e.g., previously stored) are available, the latter which may be held for instance in the $BDB_L$, $BDB_c$, or other storage location as previously described.

Lastly, per step 1010, the identity of the user is determined (or a putative identity confirmed/refuted) based at least on the evaluation of step 1008. For example, in one implementation, if each of the individual parameter evaluations achieves a sufficient minimum score/probability or value, then the identity of the user is validated against the stored (criterion) data. Alternatively, if the aggregated score/probability is sufficiently high, the user may be validated. Other metrics or approaches for identity validation acceptance will be recognized by those of ordinary skill given the present disclosure.

Figure 11:
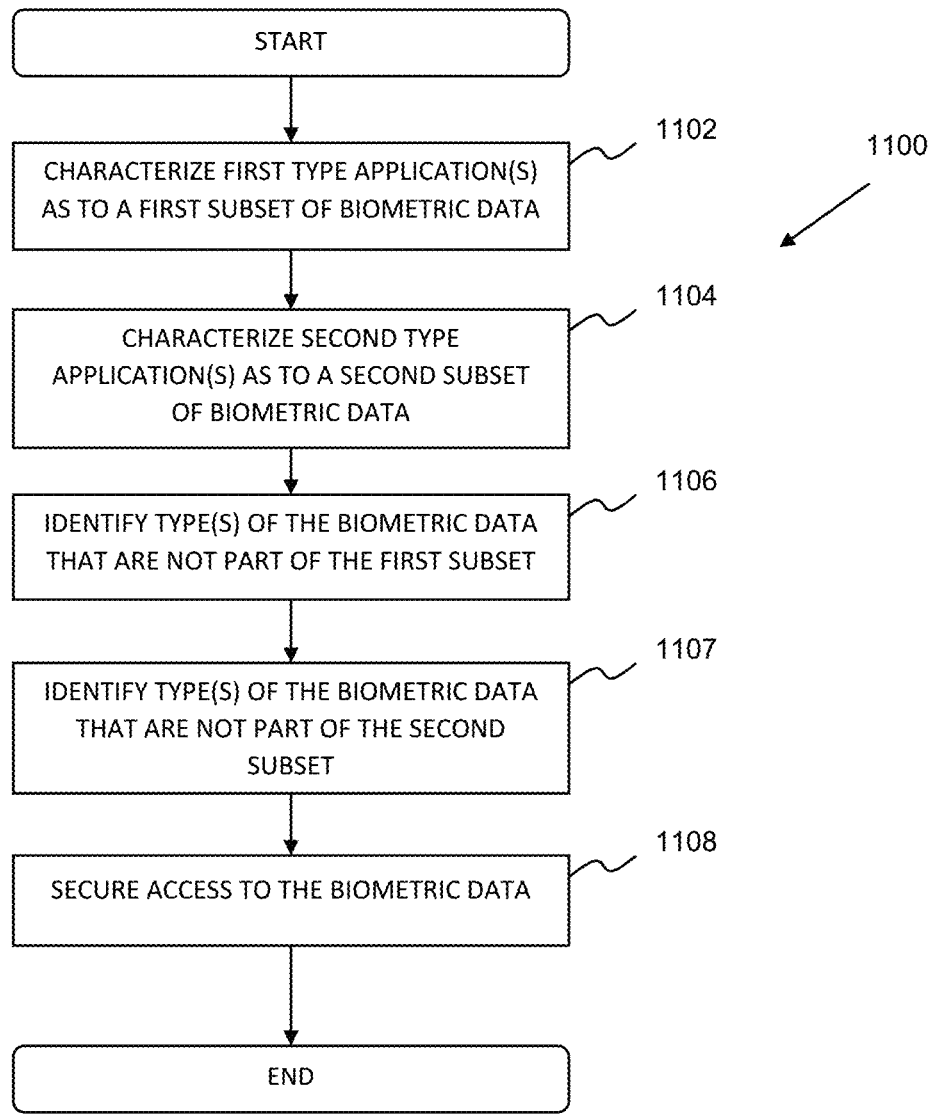
FIG. 11 is a logical flow diagram illustrating one embodiment of a method for biometric data protection according to the present disclosure.

Referring now to FIG. 11, one embodiment of a method 1100 of protecting a plurality of biometric data associated with a user is shown and described. In this exemplary embodiment, the plurality of biometric data is useful in one or more computer programs of a first type (e.g., one or more AR applications), and one or more computer programs of a second type (e.g., one or more VR applications).

In a first step 1102 of the method, the one or more computer programs of the first type are characterized as to a first subset of the plurality of biometric data needed to support operation thereof. For example, an AR application may want data related to the user's vision, height, weight, preferences, heart rate, languages spoken, etc. in support of the AR functions thereof (see discussion of use cases/scenarios infra). In one implementation, the characterization of the exemplary AR application as to a first subset of the plurality of biometric data needed to support operation thereof includes accessing at least one of: (i) a registry associated with the AR application, and/or (ii) an application programming interface (API) associated with the AR application.

Similarly, per step 1104, the one or more computer programs of the second type (e.g., VR) are characterized as to a second subset of the plurality of biometric data needed to support operation thereof. In one implementation, the second subset is at least partly different than the first subset and hence are not completely overlapping; i.e., contains more or less parameters, or the same number with at least one of them being different, etc.

Next, per step 1106, one or more types of the plurality of biometric data that are not part of the first subset are identified, and per step 1107, one or more types of the plurality of biometric data that are not part of the second subset are also identified. This is accomplished in one embodiment by simply performing a mathematical intersection or array calculation with a complete set of available parameters which could be considered, to identify such excluded parameters.

Finally, per step 1108, the identified one or more types of the plurality of biometric data that are not part of the first subset are used to secure access to the plurality of biometric data that are part of the first subset, and the identified one or more types of the plurality of biometric data that are not part of the second subset are used to secure access to the plurality of biometric data that are part of the second subset. Specifically, in one variant, the cached biometric data can be "secured" by other biometric data of the relevant user(s). For example, the cached profile or persona may not include one or more non-critical biometric elements useful for authentication of the target UE or user to support the application/scenario. For instance, the user's (target) UE may utilize an AR application which requires biometric data types A, B, and C (or subsets thereof) to operate. It does not require biometric data types D or E, however, and hence these latter data types can be used to authenticate the user to the Cui or Dui local process (e.g., be stored in association with the other data types, but be used as a "gatekeeper" function for access by the AR application/target UE to the other data types.

As such, the data types used for the foregoing gatekeeper functions may also be dynamically varied based on application/scenario. For instance, the aforementioned AR application might require biometric data types A, B and C as noted, which a VR application associated with the same user and/or UE might require data types B, C, and F. Accordingly, authentication/access to the given user's biometric profile by the AR application could be protected via data types D and E, while access by the VR application controlled by data types A and D, or A and E, or A and D and E. So as to prevent corruption of the data (i.e., a given device or user obtaining A-E data at the same time, accesses can be resource locked (e.g., no simultaneous access by different applications, different data/protocol sessions, subsequent access by the same user/device within a prescribed temporal period, are executing on different operating systems of respective ones of different computerized devices, etc.).

In one implementation, the plurality of biometric data is maintained in at least one computerized database such as the $BDB_c$ or $BDB_L$, and the access of the plurality of biometric data needed to support operation of the one or more computer programs of the first type via an application programming interface (API) associated with the at least one computerized database; e.g., the one or more computer programs of the first type generating an API call and transmitting the API call to a server process associated with the database via a 5G NR wireless bearer, with the server process performing the aforementioned resource locking.

Figure 12:
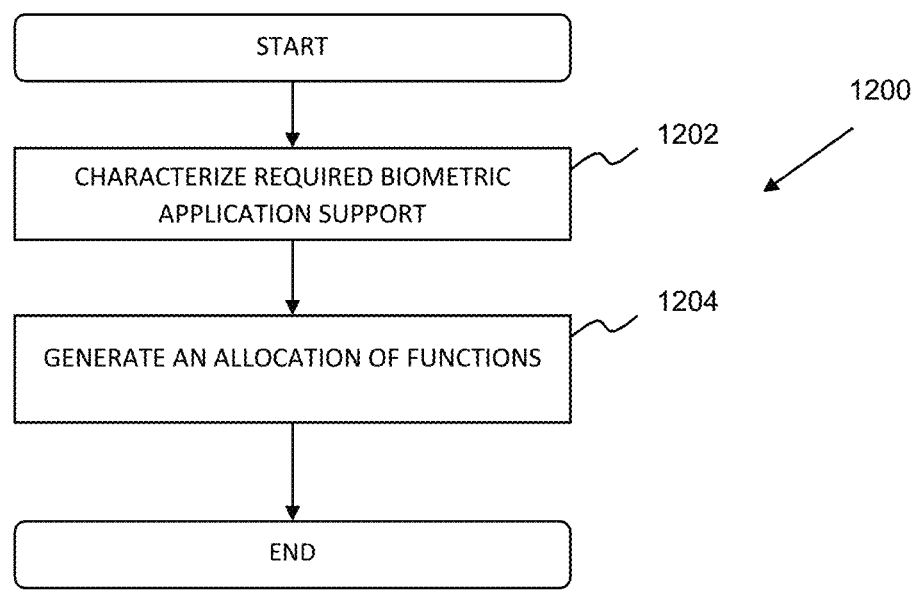
FIG. 12 is a logical flow diagram illustrating one embodiment of a method for operating a wireless infrastructure to optimize biometric application support according to the present disclosure.

Referring now to FIG. 12, a method 1200 of operating a wireless infrastructure to optimize biometric application support is shown and described. In one embodiment, the wireless infrastructure has at least one controller or centralized process and a plurality of distributed processes in data communication with the controller/centralized process, such as the CU/DU architectural components of the 5G NR network standards previously described herein.

Per step 1202, the required biometric application support for a biometric application operative to execute on a mobile wireless device served by at least one of the distributed processes (e.g., UE/UEi) is characterized. As previously discussed, such characterization may include e.g., types of biometric data required, latency requirements if any, QoS requirements if any, associated UE and user correlations including other devices.

In one variant, the characterization of the required biometric application support for the biometric application includes: (i) identifying at least one source or sink process associated with the biometric application; (ii) determining at least one data bandwidth requirement associated with the at least one source or sink process; and (iii) determining a temporal latency resulting from the data bandwidth requirement for the at least one source or sink process. In one implementation, the dynamic configuration includes identifying one of a plurality of predetermined functional allocations with a highest level of performance relative to the determined temporal latency.

In another variant, the characterization includes: (i) identifying at least one source or sink process associated with the biometric application (e.g., another UE, server, etc.); and (ii) determining that the identified source/sink process is a process served by one of the plurality of distributed processes (e.g., DU/DUi) other than the target DU/DUi. The dynamic configuration identifies one of a plurality of predetermined functional allocations which optimizes such inter-distributed process (e.g., inter-DU/DUi) data communication performance, whether based on latency, reduced backhaul bandwidth requirements, QoS/robustness, or otherwise.

Per step 1204, based at least on the characterization of step 1202, an allocation of a plurality of functions associated with the PHY (physical layer) and at least one layer above the PHY provided by the at least one of the distributed processes and the central process is generated. In one variant, the CU/DU split is configured according to one or more optimization algorithms or factors, such as where a UE exchanging biometric data is within a common gNB or RAN as another UE or entity with which the first UE is communicative via a data session of the supported application (e.g., a common gaming or VR session).

In one implementation of the method 1200, identification of the one of a plurality of predetermined functional allocations which optimizes inter-distributed process data communication performance includes implementing a functional allocation wherein all but RU (Radio Unit) functions are maintained within the at least one and the other plurality of distributed processes (e.g., Split Option 8 for maximum intra-RAN coordination).

In one variant of the method 1200, the CUi BAE receives or obtains data indicative of a particular application scenario or use case being invoked, such as via an appropriate biometric NSSAI supplied by a target UE's application running on the UE, or an appropriately configured DUi serving a target UE. Alternatively, the BAE may be configured to "self-recognize" such applications based on e.g., the types or configuration of data being interchanged between the UE and one or more serving DUi.

Figure 13:
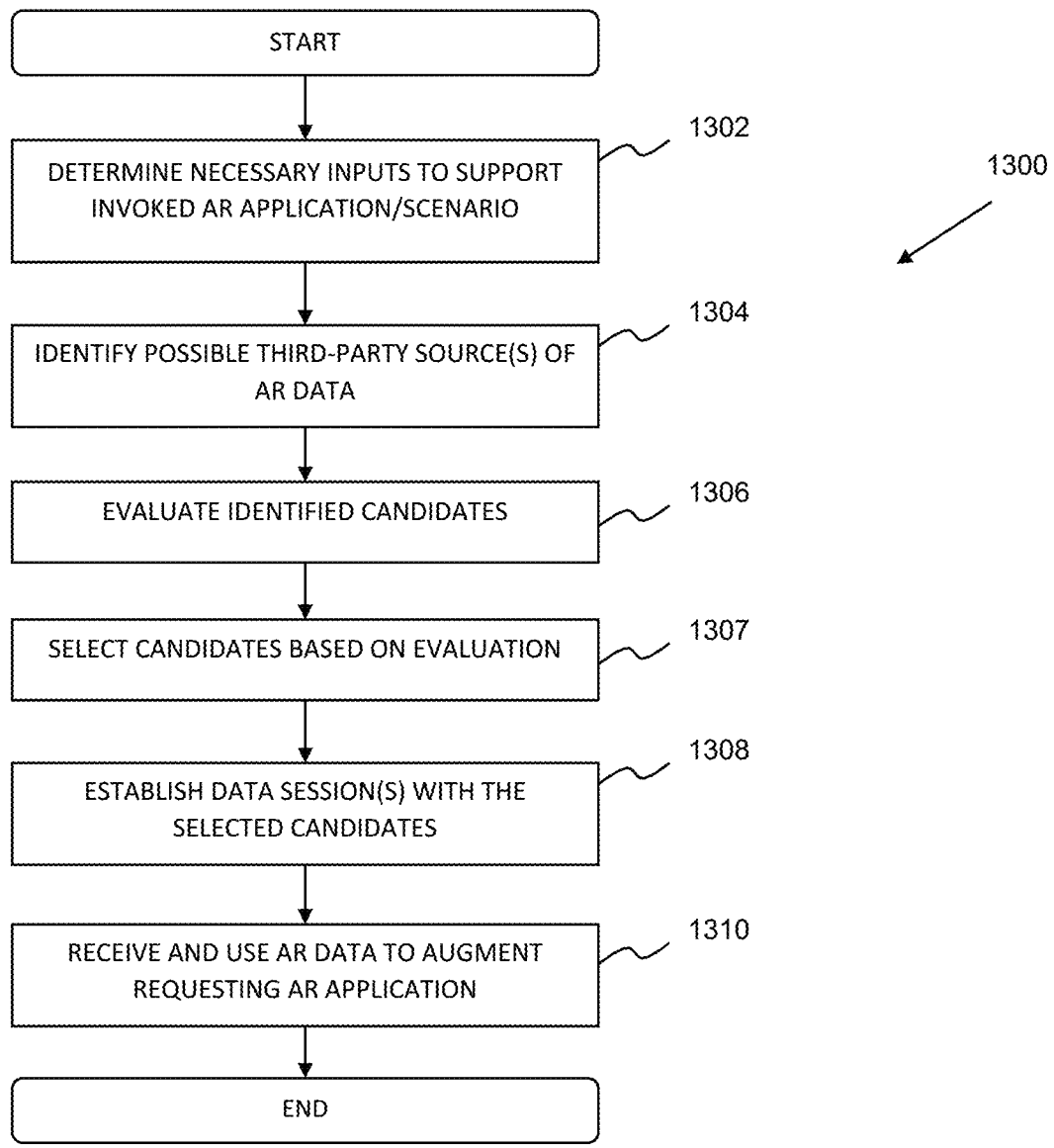
FIG. 13 is a logical flow diagram illustrating one embodiment of a method for third-party data augmentation according to the present disclosure.

Referring now to FIG. 13, one embodiment of a method 1300 for third-party augmentation is disclosed. As used herein, the term "third-party" includes one or more entities or processes other than the target UE/UEi or process.

First, per step 1302, necessary inputs to support an AR application or scenario that has been invoked or will be invoked are determined. This may be triggered off the method of FIG. 10 or 12 above (e.g., data indicative of a particular application or scenario), or based on other criteria.

Next, in step 1304, one or more possible third-party sources of AR data are identified. In one variant, a data message is sent to the cognizant CUi to identify assets or sources within common gNB RAN coverage.

Next, per step 1306, the suitability of candidates identified in step 1304 is evaluated. Per step 1307, one or more candidate(s) from the pool are selected based on the evaluated suitability.

Per step 1308, data session(s) are established with the selected candidate(s).

Per step 1310, AR data is received by the target (requesting) UE and used to augment the requesting AR application on the target UE.

Figure 14:
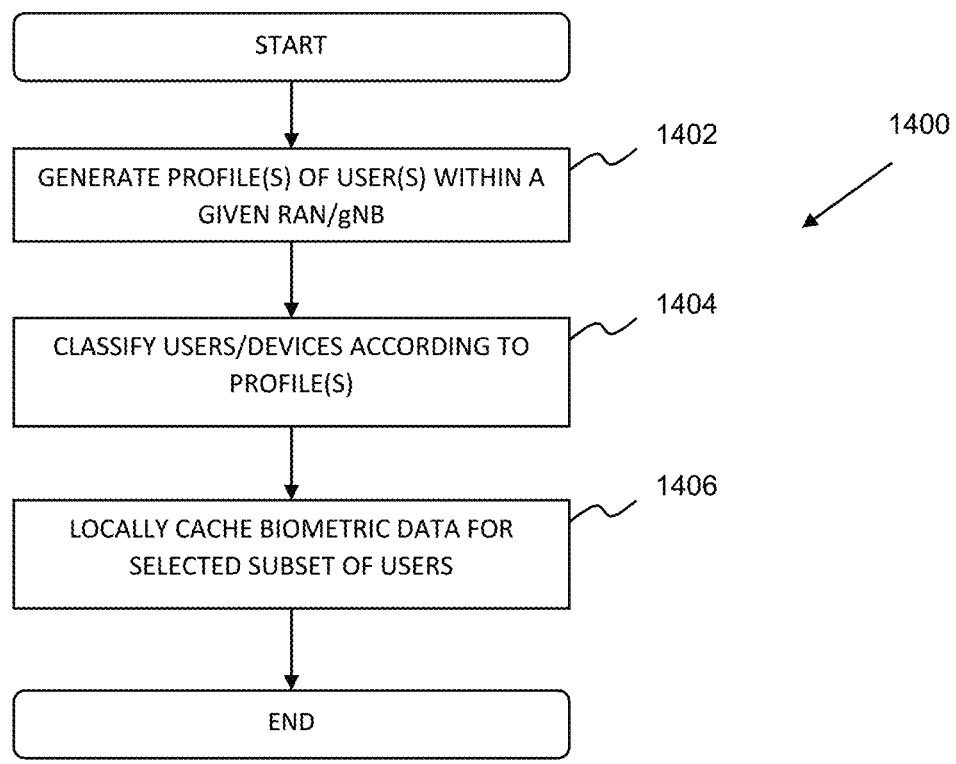
FIG. 14 is a logical flow diagram illustrating one embodiment of a method for intelligent data caching of biometric data (e.g., locally), according to the present disclosure.

Referring now to FIG. 14, one embodiment of a method 1400 for intelligent biometric data caching is disclosed.

Per step 1402, one or more profiles of use/users within a given RAN/gNB or portion thereof are generated, such as via the BAEL associated with that RAN, or by a BAEc.

Next, per step 1404, users/devices are classified according to the aforementioned use profile (e.g., as high likelihood, low likelihood, device transfer types, etc.).

Per step 1406, biometric data is locally cached (e.g., within the cognizant CUi/BAE or even specific DUi within that gNB) for selected subset (e.g., high probability) of users.

Moreover, as part of the method 1400, the biometric "uniqueness" of an individual user can be assessed and used to decide if more/less caching of data is warranted (e.g., where a given high-probability or frequent user is biometrically diverse in many attributes from other individuals, or requires a lesser level of biometric profile/persona support than others (e.g., infrequently engages in AR, and never in VR, etc.), a lower level of caching of data may be applied for that user.

The method 1400 may also include logic which associates or links persona or profiles with specific user contexts, other users (contacts), communication modalities (e.g., for email, persona masked for anonymity), devices, as described elsewhere herein.

Exemplary Use Cases and Scenarios—

Numerous use cases or applications (generally) relating to access, use, storage, and distribution of biometric and biometric-related data may be supported by the various aspects of the present disclosure, some of the following being merely exemplary and illustrative of the broader genus.

Use Case No. 1—Third-Party Augmented Reality

In one such use case (discussed with respect to FIG. 13), a given user's UE ("target user") application is augmented with data from another geographically or logically proximate UE or sensing device/process via (i) a logically interposed controller process, and/or (ii) a controller process disposed on the target user's UE. See FIGS. 4*a*-4*f* for various exemplary architectures which support such use case in the 5G NR context.

For instance, a user running an AR algorithm or application on their UE/UEi may act as a target UE for augmentation data from one or more "associated" or secondary (source) UE bearing one or more prescribed relationships to the target UE. Such prescribed relationship may be for example based on geography (e.g., within a given distance or radius), having sufficient sensory data collection capability, being within a prescribed network or social or logical grouping of users, and/or having LOS or "eyes on" a given spatial point or event during a prescribed time period.

The selected one or ones of the foregoing relationship criteria may be predetermined, or dynamically selected at runtime (i.e., when the AR augmentation need is established). This determination may be based also on the types of augmentation capabilities of the AR application in use. As a simple example, consider where the AR application seeks to provide contemporaneous alternate perspective "reality" to the target user/UE from another nearby UE or device having visual or camera capabilities. As such, any prospective source or third-party UE/device must be able to provide LOS (line of sight) to the prescribed coordinates of interest being augmented for the target UE/user. As one example, an IoT mounted camera on e.g., a light pole in a city has a fixed, known location, and hence calculations regarding LOS availability to a given spatial coordinate (e.g., where a user is looking at a given moment in time) can be readily performed, including placement of intervening objects such as buildings, to determine eligibility for a give source device/sensor for a particular augmentation need of the target device. Mobile devices such as third party UEs or vehicle telematics systems can be geo-located per their GPS/A-GPS receivers, and/or association/telemetry with wireless access nodes or base stations (to at least some level of spatial resolution), or even using third-party sensors such as traffic sensors/cameras.

As alluded to previously, 5G NR capability (i.e., performance on the order of 1 ms roundtrip latency and 10 Gbps bandwidth) enables such applications, since a user having his/her reality augmented should (i) not experience degradation of user experience such as jerkiness or delay in rendering of imagery/data, and (ii) may rapidly change context or other attributes associated with their given scenario (e.g., may turn their head frequently, thereby causing repeated updates to the foregoing exemplary calculations for LOS, position, etc.).

Use Case No. 2—Physical Characteristic Accentuation/Compensation

In another use case, the methods and apparatus described herein may be used for, inter alia, altering or compensating for one or more physical characteristics in reality within one or more others of the domains above, or vice versa. For example, a handicap associated with a given person (such as a speech impediment) can be obviated in the virtual domain, such that the user's interactions with other virtual entities occur without the speech impediment being present. Likewise, virtual characteristics or preferences may be used to modify or augment or support interactions in the real world.

In one implementation, a historical database relating to particular instances of the user's impediment is created and stored in an accessible data repository such as the $BDB_c$ or $BDB_L$, or even on a user's UE/client. The database can be rapidly accessed and searched for instances relating to a particular proposed virtual interaction, and the particular instance of the impediment identified and corrected using either a pre-stored (a priori) correction, or one generated dynamically by the process such as via AI algorithms or templates/models, or consultation of an online database or API.

The algorithms may also be structured such that different contexts are sensed or otherwise determined (e.g., via user input to that effect), or from the context module (CM) of the BAE, and these contexts used to determine configuration or selection of capabilities and functions. For example, a user walking in a public place may not utilize visual capture (e.g., for privacy reasons), but that same user in their home might have visual (and other) interfaces or capture mechanisms enabled.

In one implementation, the AI algorithms of the present disclosure are further configured to be "trained" or instructed on desired user interaction mechanisms. For example, the algorithm operative to run on the user's device may infer that the present user is color-blind, hearing impaired, or is distracted. The device can escalate to a different or higher intensity interface accordingly.

Use Case No. 3—Passive User Identification

In one implementation, a user's UEi (e.g., smartphone) is configured to identify a person based on one or more passive biometric data inputs or sensors. For example, in one configuration, the user's walk (as determined by accelerometer and/or other sensors and supporting analytical algorithms within the $BAE_{ci}$ operative on the UEi), heart rate (as determined by e.g., a worn device such as a personal physiological monitor such as a Fitbit), or other identity-related information, thereby obviating the need for active invocation of algorithms by that user. Other context-based information such as the user's then-present location, altitude relative to sea level, time of day, prevailing environmental data (e.g., temperature, barometric pressure), etc., may also be used to determine context for purposes of (i) user identity validation (e.g., so that a friend who happens to be walking with the user and carrying the user's smartphone for the user is not misinterpreted as the user), and (ii) more accurate application of biometric profiles.

Use Case No. 4—Context Maintenance Between Real/Virtual Domains

In another aspect, context determination analysis such as that performed by the context module(s) of the BAE is utilized in the virtual, augmented, or temporal realities to enable "intelligent" reality (real world) participation in one or more events or aspects of behavior. For example, if a person normally speaks Japanese language in their virtual reality sessions (such as to become more proficient at the language, because they are interacting with other virtual entities who speak Japanese only, etc.), that person can, in the real domain (or the AR domain), be directed to nearby Japanese restaurants, receive AR data particularly tuned to Japanese-specific cultural items (e.g., highlighting and provision of data such as pricing, colors, etc. of Japanese sourced items within a shopping mall through with they are walking). As such, their "actual" reality can be augmented or "shaped" with Japanese influences or context in real time, and the e.g., Japanese context maintained across domains.

Likewise, in the real or AR domains, one can use their "persistent persona" to specify various information delivery models. For example, a user's persona that is selected as the basis of extension into the other domains may specify user interface attributes, such as the desired form of feedback (e.g., visual, haptic, audio) by which to receive the delivered information.

An individual can have multiple persistent persona to choose from, and select based on context (the selection can also be performed algorithmically, based on output from the context module (CM) of the BAE).

In another exemplary implementation, a computerized mapping or similar application may be automatically customized based on the persistent profile of the user. For instance, in one such case, visual directions, audio directions, or alternately a "rumble box haptic" feedback may be selectively and dynamically provided to steer a user in the right direction.

Use Case No. 5—Temporal Shift Reality

Temporal shift reality (TSR) can be used for a number of different purposes or applications, including for example illustrating to a user the (future) result of one or more actions taken by the user or planned to be taken by the user. For instance, a sensor perceiving motion of an object (e.g., a car driving down a street which the sensor—e.g., camera, or a third-party augmented source such as a street pole security camera—is monitoring), can algorithmically project the location of that car at some future time based on its observed (calculated) direction and speed, or can obtain it from other sources, including the vehicle itself or another external sensor/system via a 5G or other data link. A user approaching that street while walking can also algorithmically be projected to be at a certain place at that same time in the future; as such, the user can be provided with an "early warning system" via their user interface currently in use (e.g., the smartphone display, speaker, AR headgear, AR audio device, haptic feedback, etc.) so as to avoid their walking in front of the car. In one such variant, an image of the user in a parallel "virtual" plane is generated and its location projected on a user accessible display, showing the extrapolated user position (e.g., a "ghost" or low opacity image is generated for the user via an AR device as an AR glasses set showing their future position and that of the car hitting them).

Similarly, in another implementation, a vehicular display (e.g. a windshield display projection system or "HUD") can be utilized as a temporal reality presentation system for the user. Via 5G NR DU/CU, the car can also communicate with the smartphone (e.g., via a broadcast protocol) that it detects walking towards the street, such as based on biometric attribute matching to the known user of the smartphone. In effect, the telematics system of the vehicle can identify the user projected to walk out into the street in front of it, determine identity based on cached local biometrics (the population being reduced since the intelligent caching described herein selectively populates the local cache with current, active users in one model), and contact the UE of that user in effect instantaneously to warn them.

By caching biometric data specific to the user locally to the user's current access node (e.g., a DUi near the street), ultra-low latency functions such as user-specific TSR can advantageously be supported.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein. Furthermore, features from two or more of the methods may be combined.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium.

Appendix A—5G Performance Requirements

TABLE A-1

| 5G NR Capacity requirements | |
| --- | --- |
| At F1 interface, Option 2 | DL 4016 Mb/s; UL 3024 Mb/s |
| At Fx interface, Option 7 | DL: 10.1~22.2 Gb/s 37.8~86.1 Gb/sUL: 16.6~21.6 Gb/s 53.8~86.1 Gb/s |
| At Xn interface: | 25 Gb/s-50 Gb/s |
| At NG interface For CU: | 10 Gb/s-25 Gb/s |
| Fronthaul (Dependent on number of CPRI and eCPRI interfaces) | 10 Gb/s-825 Gb/s |
| Midhaul and Backhaul (varies with number of interfaces) | 25 Gb/s-800 Gb/s |
| gNB[1] | Peak: 6.14 Gb/s for 5GLF (low frequency), 19.8 Gb/s for 5G HF (high frequency) Average: GSTR-TN5G (2018-02) 13 2.97 Gb/s for 5G LF; 9.9 Gb/s for 5G HF |

[1]Based on combination of NG and Xn interfaces, and includes capacity based on a gNB for 3 cells with 64T 64R anntennas (low frequency) and 2T 2R (high frequency).

TABLE A-2

| 5G NR Latency requirements | |
| --- | --- |
| At F1 interface Option 2 | 1.5~10 msec |
| At Fx interface | (a few hundred μsec) |
| Fronthaul | <100 μsec |
| UE-CU (eMBB) | 4 ms |
| UE-CU (uRLLC) | 0.5 ms, |

TABLE A-3

| 5G NR Network reach requirements | |
| --- | --- |
| Fronthaul | 1~20 km |
| Midhaul | 20~40 km |
| Backhaul | 1~10 km |
| Backhaul Aggregation | 5-80 km |
| Backhaul Core | 20~300 km |

What is claimed is:

1. A method of algorithmically determining an identity of a user of a computerized mobile device, the method comprising:
determining at least one context of the user based at least on a user's online activity during a prescribed period of time, wherein the at least one context is further determined at least in part based on data on a user's client device and at least one third-party sensor or device, wherein the prescribed period of time varies dynamically based on how frequently the user changes context;
algorithmically selecting, based on the determined at least one context, a plurality of biometric parameters upon which to base the identity determination;
obtaining biometric data specific to the user via at least the computerized mobile device, the obtained biometric data relating to the selected plurality of biometric parameters;
evaluating the obtained biometric data relating to the selected plurality of biometric parameters against data relating to one or more acceptance criteria; and
determining the identity of the user based at least on the evaluating.

2. The method of claim 1, wherein the determining an identity comprises algorithmically verifying or validating the user as who they assert themselves to be to the computerized mobile device, the assertion being conducted via at least a user interface of the computerized mobile device.

3. The method of claim 1, wherein the determining at least one context comprises:

selecting, based at least in part on the plurality of data relating to the user's online activity during the prescribed period of time, one of a plurality of preexisting context models; and using at least the selected one of the context models as part of the determining the at least one context.

4. The method of claim 3, wherein the selecting, based on the determined at least one context, a plurality of biometric parameters upon which to base the identity determination, comprises:

accessing configuration data for the computerized mobile device; and based at least on the accessed configuration data, identifying a possible population of biometric parameters from which to select the plurality of biometric parameters.

5. The method of claim 3, wherein:

the prescribed time period comprises a window of time extending from a past time to a then-current time;

the obtaining the plurality of data relating to the user's online activity during the prescribed period of time comprises obtaining the plurality of data relating to the user's online activity during the window; and the selecting, based at least in part on the plurality of data relating to the user's online activity during the prescribed period of time, one of a plurality of preexisting context computer models comprises:

identifying a plurality of candidate context computer models based at least in part on the obtained plurality of data relating to the user's online activity during the window;

assigning at least one of a probability or score to each of the candidate context computer models based at least; and selecting the one of the candidate context computer models with a highest at least one of probability or score as the one of the plurality of pre-existing context computer models.

6. The method of claim 1, wherein the selecting, based on the determined at least one context, a plurality of biometric parameters upon which to base the identity determination, comprises selecting each of the plurality of biometric parameters based on data relating to a pre-assigned reliability or confidence level associated with the determined at least one context.

7. The method of claim 1, wherein the obtaining biometric data specific to the user via at least the computerized mobile device comprises obtaining the biometric data passively and without affirmative user input, via at least one sensor of the computerized mobile device.

8. The method of claim 1, wherein the at least one third-party sensor or device has a line of sight to geographic coordinates being augmented by the user's client device.

9. The method of claim 1, wherein the at least one third-party sensor or device comprises at least one of (i) a traffic sensor or (ii) a security or traffic camera.

10. An apparatus comprising:

a processor;

a non-transitory computer-readable medium having stored thereon instructions that are executable by the processor to cause the apparatus to perform operations comprising:

determine at least one context of the user based at least on a user's online activity during a prescribed period of time, wherein the at least one context is further determined at least in part based on data on a user's client device and at least one third-party sensor or device the prescribed period of time varies dynamically based on how frequently the user changes context;

select, based on the determined at least one context, a plurality of biometric parameters upon which to base the identity determination;

obtain biometric data specific to the user via a computing device, the obtained biometric data relating to the selected plurality of biometric parameters;

evaluate the obtained biometric data relating to the selected plurality of biometric parameters against data relating to one or more acceptance criteria; and determine the identity of the user based at least on the evaluating.

11. The apparatus of claim 10, wherein the instructions further cause the apparatus to perform operations comprising:

verify or validate the user as who they assert themselves to be to the computing device, the assertion conducted via at least a user interface of the computing device.

12. The apparatus of claim 10, wherein the determination of the at least one context comprises:

select, based at least in part on the plurality of data relating to the user's online activity during the prescribed period of time, one of a plurality of preexisting context models; and use at least the selected one of the context models as part of the determining the at least one context.

13. The apparatus of claim 12, wherein the selection, based on the determined at least one context, a plurality of biometric parameters upon which to base the identity determination, comprises:

access configuration data for the computing device; and based at least on the accessed configuration data, identify a possible population of biometric parameters from which to select the plurality of biometric parameters.

14. The apparatus of claim 12, wherein:

the prescribed time period comprises a window of time extending from a past time to a then-current time;

the obtaining of the plurality of data relating to the user's online activity during the prescribed period of time comprises obtaining the plurality of data relating to the user's online activity during the window; and the selection, based at least in part on the plurality of data relating to the user's online activity during the prescribed period of time, one of a plurality of preexisting context computer models comprises:

identify a plurality of candidate context computer models based at least in part on the obtained plurality of data relating to the user's online activity during the window;

assign at least one of a probability or score to each of the candidate context computer models based at least; and select the one of the candidate context computer models with a highest at least one of probability or score as the one of the plurality of pre-existing context computer models.

15. The apparatus of claim 10, wherein the selection, based on the determined at least one context, a plurality of biometric parameters upon which to base the identity determination, further comprises:

select each of the plurality of biometric parameters based on data relating to a pre-assigned reliability or confidence level associated with the determined at least one context.

16. The apparatus of claim 10, wherein the obtaining biometric data specific to the user via at least the computing device comprises obtaining the biometric data passively and without affirmative user input, via at least one sensor of the computing device.

17. The apparatus of claim 10, further comprising a wireless infrastructure having at least one controller process and a plurality of distributed processes in data communication with the controller process, wherein the instructions further cause the apparatus to perform operations comprising:
    characterize required application support for an application operative to execute on a mobile wireless device served by at least one of the distributed processes;
    based at least on the characterization, dynamically configure an allocation of a plurality of functions associated with the physical layer and at least one layer above the physical layer provided by the at least one of the distributed processes and the central process, the dynamic configuration optimizing said support in at least one aspect.

18. The apparatus of claim 17, wherein the characterization of the required application support for the application comprises:
    determine at least one quality of service related requirement associated with the application.

19. The apparatus of claim 17, wherein the characterization of the required application support for the application comprises:
    identify at least one source or sink process associated with the application;
    determine at least one data bandwidth requirement associated with the at least one source or sink process; and
    determine a temporal latency resulting from the data bandwidth requirement for the at least one source or sink process.

20. The apparatus of claim 19, wherein the dynamic configuration comprises:
    identify one of a plurality of predetermined functional allocations with a highest level of performance relative to the determined temporal latency.

21. The apparatus of claim 17, wherein the characterizing required application support for the application comprises:
    identify at least one source or sink process associated with the application; and
    determine that the identified at least one source or sink process comprises a process served by one of the plurality of distributed processes other than the at least one of the plurality of distributed processes,
    wherein the dynamic configuration comprises:
        identify one of a plurality of predetermined functional allocations which optimizes inter-distributed process data communication performance.

22. The apparatus of claim 17, wherein the identification of the one of the plurality of predetermined functional allocations comprises:
    implement a functional allocation wherein all but radio unit functions are maintained within the at least one and the other plurality of distributed processes.

23. A non-transitory computer-readable medium having stored thereon instructions that are executable by a processor to cause a system to perform operations comprising:
    determine at least one context of the user based at least on a user's online activity during a prescribed period of time, the at least one context comprising a domain of the user, wherein the domain of the user comprises at least one of an augmented reality domain or a virtual reality domain, wherein the prescribed period of time varies dynamically based on how frequently the user changes context by switching between different domains;
    select, based on the determined at least one context, a plurality of biometric parameters upon which to base the identity determination;
    obtain biometric data specific to the user via a computing device, the obtained biometric data relating to the selected plurality of biometric parameters;
    evaluate the obtained biometric data relating to the selected plurality of biometric parameters against data relating to one or more acceptance criteria; and
    determine the identity of the user based at least on the evaluating.

24. The non-transitory computer-readable medium of claim 23, wherein at least one context of the user further comprises a physical activity of the user in the real world, and further wherein the physical activity of the user comprises at least one of the user being at work, the user engaging in a leisure activity, the user being asleep, the user being awake, the user driving a vehicle, or the user eating.

25. The non-transitory computer-readable medium of claim 23, wherein at least one context of the user further comprises a geographic location of the user, and further wherein the geographic location of the user identifies at least one of a building where the user works, a home of the user, a location in which the user is in transit, or a mall.

26. The non-transitory computer-readable medium of claim 23, wherein at least one context of the user further comprises a interpersonal interaction of the user, and further wherein the interpersonal interaction of the user comprises at least one of a face-to-face conversation or interaction between the user and another person, a telephone conversation between the user and another person, a video chat conversation between the user and another person, a virtual or augmented reality conversation or interaction between the user and another person, a conflict between the user and another person, or a romantic interaction between the user and another person.

* * * * *